(12) United States Patent
Barker et al.

(10) Patent No.: US 10,681,881 B2
(45) Date of Patent: Jun. 16, 2020

(54) APPARATUS AND METHOD FOR AUTOMATED AEROPONIC SYSTEMS FOR GROWING PLANTS

(71) Applicant: Econow Systems, LLC, San Diego, CA (US)

(72) Inventors: Stephen F. Barker, Centerville, OH (US); Yakov Kaplan, San Diego, CA (US)

(73) Assignee: Econow Systems, LLC, San Diego, CA (US)

( * ) Notice: Subject to any disclaimer, the term of this patent is extended or adjusted under 35 U.S.C. 154(b) by 0 days.

(21) Appl. No.: 16/268,152

(22) Filed: Feb. 5, 2019

(65) Prior Publication Data

US 2019/0166777 A1    Jun. 6, 2019

Related U.S. Application Data

(63) Continuation of application No. 15/707,899, filed on Sep. 18, 2017, now abandoned.
(Continued)

(51) Int. Cl.
*A01G 31/04* (2006.01)
*F21V 33/00* (2006.01)
*A01G 9/08* (2006.01)
*A01G 9/029* (2018.01)
*A01G 31/00* (2018.01)
(Continued)

(52) U.S. Cl.
CPC ......... *A01G 31/042* (2013.01); *A01G 9/0295* (2018.02); *A01G 9/085* (2013.01); *F21V 33/00* (2013.01); *A01G 27/00* (2013.01); *A01G 2031/006* (2013.01); *H05B 47/10* (2020.01); *Y02P 60/216* (2015.11)

(58) Field of Classification Search
CPC ...... A01G 31/02; A01G 31/04; A01G 31/042; A01G 31/045; A01G 31/0047; A01G 31/06
See application file for complete search history.

(56) References Cited

U.S. PATENT DOCUMENTS 3,961,444 A    6/1976   Skaife
4,035,951 A    7/1977   Dedolph
(Continued)

OTHER PUBLICATIONS

Metrocrops, LLC., Use of Hydroponic and Led Technology to Grow High Nutrient Lettuce, Spinach and Arugula in a Small, Urban, High Density, Indoor Farm, 4 pages. Document retrieved Aug. 25, 2016.
(Continued)

*Primary Examiner* — Thanh Pham
(74) *Attorney, Agent, or Firm* — Santangelo Law Offices, P.C.

(57) ABSTRACT

The present invention may relate to Aeroponic Systems and their individual elements. More particularly to automated systems capable of monitoring and adjusting some if not all of the light, nutrient, water quality and environmental factors required for the propagation and sustained growth of all types of plants. It may also describe methods to support the plants during propagation from seeds and for growth and harvesting. It may describe various methodologies for reducing space requirements and for increasing plant density without detriment to the growth cycles.

19 Claims, 18 Drawing Sheets

Related U.S. Application Data

(60) Provisional application No. 62/495,556, filed on Sep. 19, 2016.

(51) Int. Cl.
*A01G 27/00* (2006.01)
*H05B 47/10* (2020.01)

(56) References Cited

U.S. PATENT DOCUMENTS

| | | | |
|---|---|---|---|
| 4,050,188 A | 9/1977 | van Wingerden | |
| 4,098,021 A | 7/1978 | Gruber | |
| 4,100,699 A | 7/1978 | Skaife | |
| D253,586 S | 12/1979 | Rowe et al. | |
| 4,192,096 A | 3/1980 | Platt et al. | |
| 4,213,274 A | 7/1980 | Skaife | |
| 4,332,105 A | 6/1982 | Nir | |
| 4,697,382 A | 10/1987 | Koeniger | |
| 4,753,037 A | 6/1988 | Whitcomb | |
| 4,777,764 A | 10/1988 | Van Wingerden | |
| 4,869,019 A | 9/1989 | Ehrlich | |
| 4,920,695 A | 5/1990 | Garden | |
| 4,939,865 A | 7/1990 | Whitcomb et al. | |
| 5,097,626 A | 3/1992 | Mordoch | |
| 5,136,804 A * | 8/1992 | Rothem | A01G 31/02 47/59 R |
| 5,213,857 A | 5/1993 | Erkkila | |
| 5,557,886 A | 9/1996 | Whitcomb | |
| D381,933 S | 8/1997 | Van Wingerden | |
| D389,773 S | 1/1998 | Robinson | |
| 5,852,896 A | 12/1998 | Flasch, Jr. | |
| 5,983,566 A | 11/1999 | Enderlein et al. | |
| 6,612,073 B1 | 9/2003 | Powell et al. | |
| 6,673,150 B2 | 1/2004 | Garibin et al. | |
| 6,729,070 B1 | 5/2004 | Locke et al. | |
| 7,080,479 B2 | 7/2006 | Dallimore et al. | |
| 7,481,025 B2 | 1/2009 | Whitcomb | |
| 7,634,871 B2 | 12/2009 | DiPaolo et al. | |
| D614,078 S | 4/2010 | DiPaolo et al. | |
| 7,966,768 B2 | 6/2011 | DiPaolo et al. | |
| 8,132,367 B2 | 3/2012 | Cottier | |
| 8,291,639 B2 | 10/2012 | Gardner et al. | |
| 8,505,238 B2 | 8/2013 | Luebbers et al. | |
| 8,533,992 B2 | 9/2013 | Harwood | |
| 8,533,993 B2 | 9/2013 | Pettibone | |
| 8,738,160 B2 | 5/2014 | Bucove et al. | |
| 8,782,948 B2 | 7/2014 | Harwood et al. | |
| 8,881,454 B2 | 11/2014 | Janney | |
| 9,113,606 B2 | 8/2015 | Gardner et al. | |
| D741,742 S | 10/2015 | Kunnas et al. | |
| D742,784 S | 11/2015 | Harms | |
| 9,210,846 B2 | 12/2015 | VanLente | |
| 9,220,207 B2 | 12/2015 | Storey | |
| 9,345,207 B2 | 5/2016 | Juncal et al. | |
| 9,357,715 B2 | 6/2016 | Cottrell | |
| 9,374,953 B2 | 6/2016 | Martin et al. | |
| 9,433,160 B2 | 9/2016 | Soohoo | |
| 9,439,989 B2 | 9/2016 | Lalicki et al. | |
| 9,456,689 B1 | 10/2016 | Tinsley | |
| 9,474,217 B2 | 10/2016 | Anderson et al. | |
| 9,491,915 B2 | 11/2016 | Storey | |
| 9,606,553 B2 | 3/2017 | Faris | |
| 9,655,309 B1 | 5/2017 | Hall et al. | |
| 9,675,013 B2 | 6/2017 | Balestra et al. | |
| 9,986,697 B1 * | 6/2018 | Gurin | A01G 31/06 |
| 2005/0102895 A1 | 5/2005 | Bissonnette et al. | |
| 2006/0053691 A1 | 3/2006 | Harwood et al. | |
| 2006/0162252 A1 * | 7/2006 | Lim | A01G 31/045 47/59 R |
| 2008/0222949 A1 | 9/2008 | Bissonnette et al. | |
| 2009/0293357 A1 | 12/2009 | Vickers et al. | |
| 2010/0218423 A1 * | 9/2010 | Walhovd | A01G 31/02 47/62 A |
| 2011/0023359 A1 | 2/2011 | Raring | |
| 2011/0056132 A1 | 3/2011 | Gardner | |
| 2012/0279126 A1 | 11/2012 | Simmons | |
| 2014/0000162 A1 * | 1/2014 | Blank | A01G 31/06 47/62 A |
| 2014/0165468 A1 | 6/2014 | Roeser | |
| 2014/0283452 A1 * | 9/2014 | Dittman | A01G 31/06 47/62 R |
| 2015/0216131 A1 * | 8/2015 | Van Wingerden | A01G 31/02 47/59 R |
| 2016/0029578 A1 | 2/2016 | Martin | |
| 2016/0135396 A1 * | 5/2016 | Day | A01G 31/02 700/275 |
| 2016/0212953 A1 * | 7/2016 | Janssen | A01G 9/025 |
| 2016/0255781 A1 | 9/2016 | Chen et al. | |
| 2018/0077884 A1 | 3/2018 | Barker et al. | |

OTHER PUBLICATIONS

U.S. Appl. No. 62/495,556, filed Sep. 19, 2016. First Named Inventor: Barker.

U.S. Appl. No. 16/707,899, filed Sep. 18, 2017. First Named Inventor: Barker.

* cited by examiner

APPARATUS AND METHOD FOR AUTOMATED AEROPONIC SYSTEMS FOR GROWING PLANTS

PRIORITY CLAIM

This application is a continuation application of U.S. application Ser. No. 15/707,899, filed Sep. 18, 2017, which is a U.S. nonprovisional application that claims priority to and the benefit of U.S. Provisional Application No. 62/495,556 filed Sep. 19, 2016. Each aforementioned application and any priority case is hereby incorporated by reference herein in its entirety.

FIELD OF THE INVENTION

The present invention relates to Aeroponic Systems, their individual elements, consumables and distribution channels. More particularly to automated systems capable of monitoring and adjusting some if not all of the light, nutrient, water quality, environmental factors and physical space required for optimized propagation and sustained growth of all types of plants.

BACKGROUND

There are many methods of growing plants. They may range from the most ancient method of planting seeds in the ground and letting nature provide the water, nutrients and light necessary for photosynthesis to more modern methods. These would include industrial agriculture methods where the seeds are still planted in the ground, but the water, nutrients and other chemicals which may be used to promote growth and prevent intrusion of insects and plant diseases may be provided by the "farmer." Many improvements have been made with this method to improve yields and shipping durability, often to the detriment of the end product in taste and nutritional value.

Another method used more recently to grow plants is hydroponics. This method can eliminate the soil from the process, which may result in plants growing with their roots immersed in nutrient-augmented water. Hydroponics may require a horizontal means to contain the water and plants, and also a means to provide circulation of the water so that nutrients may be continuously added. This method has the drawback of still requiring a large amount of fresh water and not all plant types may be accommodated. Hydroponic systems are also prone to a disease called "pythium" or root rot. Yields are similar to traditional farming methods with a somewhat accelerated growth cycle.

The above methods are in commercial use today with the soil-based methods being overwhelmingly the most prominent. However, both land suitable for growing and water are becoming increasingly more difficult to obtain. As the world's population is growing at a rapid rate and natural resources are being depleted, these methods may find it difficult to keep pace, growing and delivering the necessary amount of edible plants.

SUMMARY OF THE INVENTION

One serious issue with current agriculture production methods may be in the delivery to market of the harvested crops. Many crops may first go to a central processing facility to be washed of the chemicals used in their production. They may then go through a long distribution chain to reach their point-of-sale. Many crops may be harvested before the plants are fully mature to allow for these long delivery times. They may then be either forcefully matured using chemicals or sold "green", so they mature once they are with the consumer. The outcome of this is that up to 40% of the crops harvested may be lost due to transportation issues and over-ripening at the point of sale and/or with the consumer.

A second issue may be that current agricultural methods may consume 80% of all ground and surface water in the United Sates to ensure productive yields. Water is a finite resource that the United States is currently consuming at a rate greater than it is being replenished. These methods may also require the addition of fertilizers, insecticides and fungicides to name a few because they may be primarily cultivated in open fields. This may have driven the agricultural industry to develop modified plant species to optimize for yields at the cost of taste, texture and nutritional value.

A third issue may have to do with the inherent seasonal nature of most agriculture crops. This usually means that a crop may become more available and might be of better quality at certain times when the plant is in season. This output is dependent on many factors, not the least of which is the environmental conditions present during the growth periods. This may affect the quality and availability of many crops.

A fourth issue may have to do with the physical space required for current agricultural methods. Traditional farming methods may require large tracts of land which may have to have their soil amended because of depletion caused by monoculture crops. These large farms may require the use of large, specialized equipment requiring training to till the soil, water the fields, apply agrochemicals and reap the harvest. The use of soil and plant amendments and the use of large scale industrial machinery may cause pollutants to be released into the biosphere.

A fifth issue may be that optimum growing conditions for a given plant may not be fully attainable using existing horticulture methods where environmental conditions may be either uncontrollable or less than optimum.

There is a critical need for a method to both grow plants that are optimized for nutritional value and taste while using a minimum amount of resources, and then deliver the plants efficiently to the point-of-sale fresh, with negligible losses and with a significantly-increased shelf life. There may also be a need for sustained output of consistent quality plants on a continuous basis to eliminate the seasonal nature of current methods Accordingly, the present invention includes a variety of aspects, devices, processes, and programs in varied embodiments which may be selected in different combinations to suit differing needs and achieve various goals.

The main issues with current offerings in this field may be the use of space, resources consumed, manpower required and a consistent, stable production system. The primary goals of the present invention may be to maximize available space to allow for significantly increased output per volumetric space. Another goal may be enclosing key growth elements to control environmental factors and may eliminate the requirement for agrichemicals which could include insecticides, herbicides, fungicides and nematicides. Another key goal may be to phase the system's output which may result in a continuous supply of mature plants, thus possibly requiring less manpower to operate. This invention also provides a means to automate large segments of the process by first supplying production materials in user-friendly packages and second, providing a system optimized to reduce labor requirements The present invention uses novel variations of aeroponics to provide systems that may have approximately 10% of the water and nutrient requirement of the soil and hydroponic based methods. This novel method also eliminates the requirement for insecticides and herbicides which have driven the GMO proliferation, the end results of which are vegetables and grains which are lower in nutrients and flavor. This method may be similar to hydroponics in that the soil is eliminated, but instead of the roots sitting in a horizontal body of water, they can be suspended in the air using a variety of methods. The water with nutrients may then be supplied in the form of a controlled mist. This method may not only greatly reduce the amount of water required, but also the plants are not restricted to a horizontal arrangement and instead can be arranged in any orientation.

In preferred embodiments, the plants are irrigated using a high-pressure spray which can provide a nutrient and oxygen rich mist to the roots. There may be a single spay bar which may be operated intermittently as the plant roots pass by it, or multiple spray bars which may be located so that they could be operated with less frequency and provide more redundancy, effectively misting all the roots at the same time. In the event of a power failure, water may be supplied to the roots by a gravity-fed drip system with water being held in a holding tank which may be initiated when a power failure opens a normally open valve being held closed by the power. This drip system may use gravity, in another embodiment it may use residual pressure and in another embodiment it may use a battery powered pump.

The plants may be captured in a continuous vertical or horizontal "belt" and/or conveyor which may be constantly moving to allow the root side to be exposed to one or more mist nozzles, while the leaf side may be exposed to light. The light may be in the form of natural sunlight, and or artificial light in the most advantageous spectrums to include infrared. The moving "belt" may reduce the amount of light required, and may also provide for a more consistent illumination of all surfaces. This "belt" arrangement may allow the root side to be maintained at its optimum temperature and oxygen levels, with the leaf side at a separate optimum temperature and $CO_2$ levels. The moving "belt" arrangement can also allow for a more compact layout, as the plants may be planted and harvested as the "belt" moves past a central point, thus possibly eliminating the requirement for access space between "belts". These "belts" and propagation elements may be housed in enclosed spaces. The basis of the systems may require contained environments which have separation between "root" and "leaf" sides.

Included may be seed sheets of porous growth medium with seeds either attached to the surface with a soluble adhesive, or trapped between two sheets which may be bonded to each other. These sheets may be oriented in any axis and may be part of a continuous conveyor or "belt." They may be held stationary in some embodiments.

Included may be a plant propagation element which may provide its own water, nutrients and light optimized for a particular plant at a particular germination stage. Also included may be planting trays for seed germination and seedling growth. These trays, which may be biodegradable and may be reusable, in one embodiment, may be provided with seeds by the manufacturer, in another embodiment, the user may populate them with seeds, seed pods or seed sheets supplied by the manufacturer or other third party. They may have a barcode, RFID tag or similar method for the propagation system to tailor the germination process using data and instructions encoded in or on them. These planting trays may be oriented in a vertical stack in one embodiment, or a horizontal stack in another embodiment. With a tray starting at one level or niche and progressing through serial levels or niches as it matures, the system may allow for optimized growth conditions at each level or niche. Because this plant propagation element may have the capacity to contain several days of a plant's complete growth cycle from germination to harvest, it may reduce the amount of time a plant would stay on a main conveyor system to reach maturity, thus increasing a system's output for a given volumetric space. Because of the controlled functions of this propagation element, it and any subsequent grow elements may produce a more consistent output in plant size and quality than traditional methods.

Water may be filtered for contaminants and particle size. The invention may also measure the nutrient level. In one embodiment, the nutrients may be added by the user and in another embodiment, they may be added automatically by the invention. The invention may also measure the pH of the water, and in one embodiment the user may add the appropriate chemistry. In another embodiment, the invention may do this automatically. Nutrients and pH altering chemistries may be packaged such that the user may have no requirement to use language to determine the correct chemical or the correct nutrient to add, and in what quantities to add them, perhaps by using symbology, pictography and/or colors. Measuring devices provided to measure these levels, and control systems which may be designed to monitor all parameters and adjust them, may also employ symbology, pictography and/or colors to convey system status and current requirements.

The technology employed in the invention may be scalable by design and may be incorporated into systems which could range from table top devices supplying one or two individuals, single family devices, home based systems to allow for income generation, container/trailer sized systems, and the like to commercial factory systems which may be capable of providing city-sized demands for a broad variety of vegetables, tubers, herbs, grains, flowering plants, and the like. Locating these systems in urban areas may reduce the time to market for mature, live plants, and may greatly simplify the supply chain. Providing live plants with a method to maintain the root's moisture level may extend their shelf life.

If the same form factor for the Seed Pods is used for both industrial and home-scale technologies, the plant germination/propagation cycle can be started on an industrial-scale system with the live seedlings delivered directly to either a system user or to point of sale vendors. Grocery type stores may have "Grow" systems to allow for the sale of either seedlings or mature live plants based on consumer tastes. These young plants could then be placed into a home-scale device to complete the growing cycle over time, or to maintain mature plants over a sustained harvest period. Having live plants available may allow the user to harvest only what they need at the time, while perhaps greatly extending the "shelf" life of the plants. This may help eliminate the complications of the current fresh produce supply chain logistics and cost while preserving the freshness of the produce. These methods and systems may also be compatible with automated home delivery scenarios.

Because the technology as employed herein may be contained in an environmentally controlled space and because there may be low energy requirements, the systems could be deployed to remote, hostile regions where they may produce a continuous supply of fresh horticultural offerings. These horticultural offerings may be local, indigenous plant types.

If the system was scaled to allow for home use, the system may be a source of income while also providing plants to the home grower.

BRIEF DESCRIPTION OF THE DRAWINGS

Some embodiments of the present invention are illustrated as an example and are not limited by the figures of the accompanying drawings, in which like references may indicate similar elements and in which.

MODE(S) FOR CARRYING OUT THE INVENTION

As mentioned earlier, the present invention includes a variety of aspects, which may be combined in different ways. The following descriptions are provided to list elements and describe some of the embodiments of the present invention. These elements are listed with initial embodiments, however it should be understood that they may be combined in any manner and in any number to create additional variations. The variously described examples and preferred embodiments should not be construed to limit the present invention to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

Figure 1:
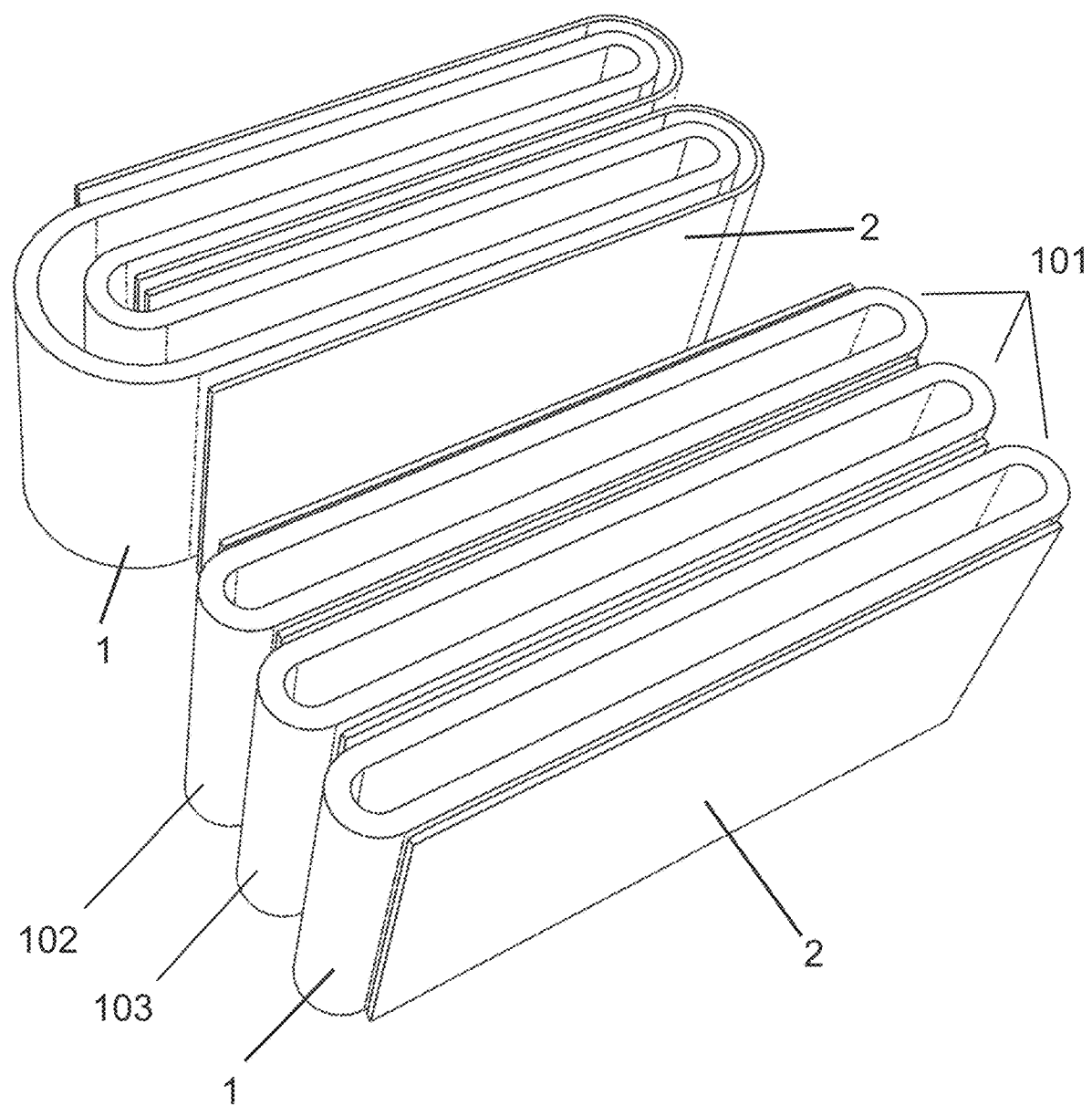
FIG. 1 depicts two variations of a vertical belt or conveyor system according to various embodiments described herein.
Figure 2:
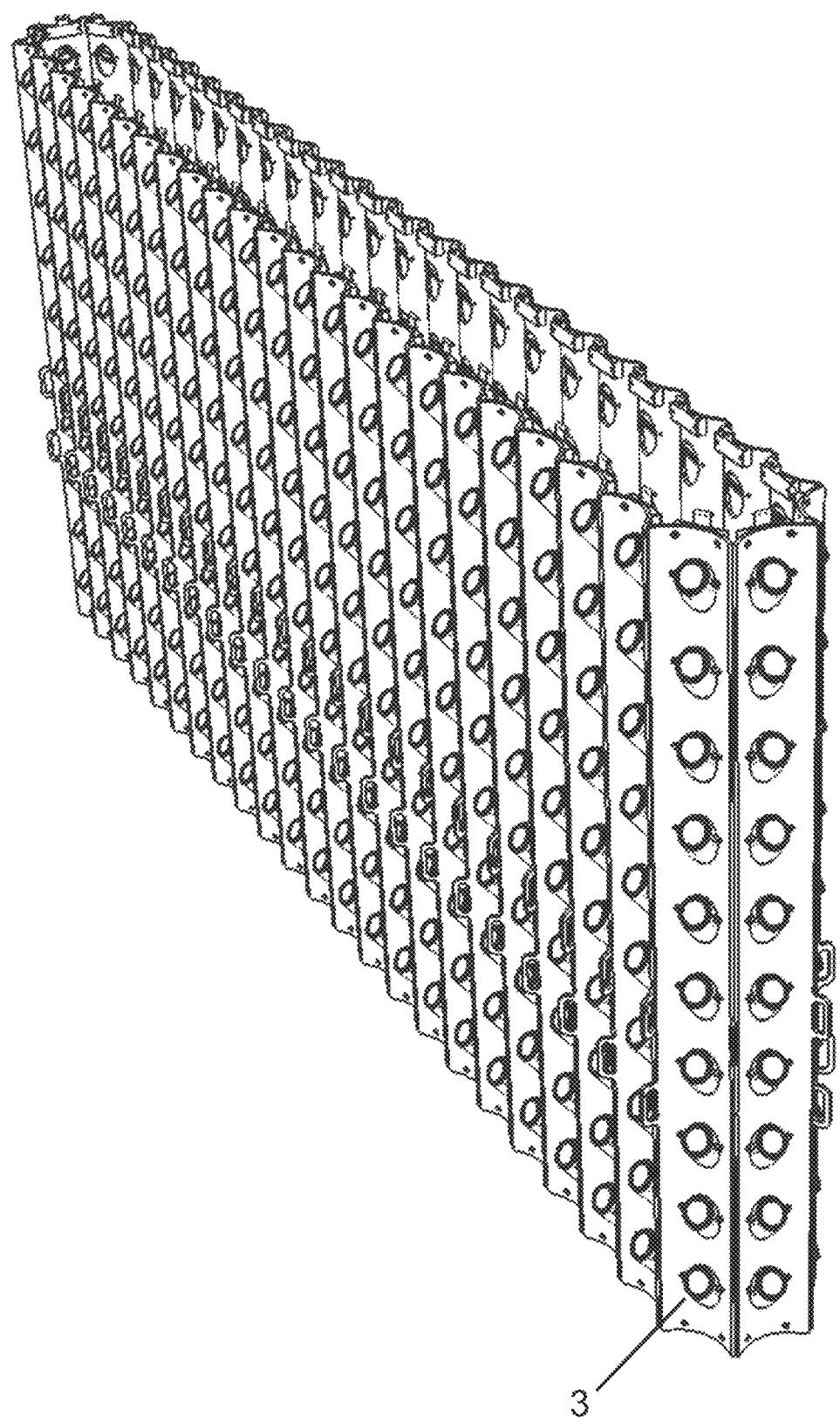
FIG. 2 depicts several sections of a hanging wall with plant pods forming a continuous vertical conveyor system according to various embodiments described herein.
Figure 3:
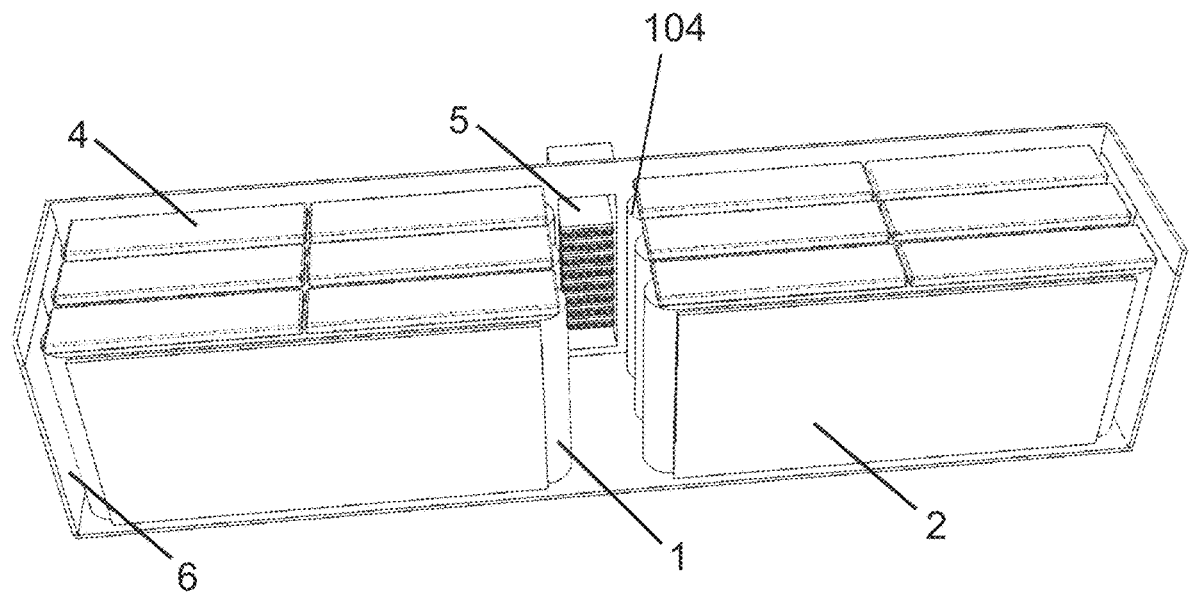
FIG. 3 depicts six vertical conveyor modules with a propagation element inside a 40-foot container according to various embodiments described herein.
Figure 17:
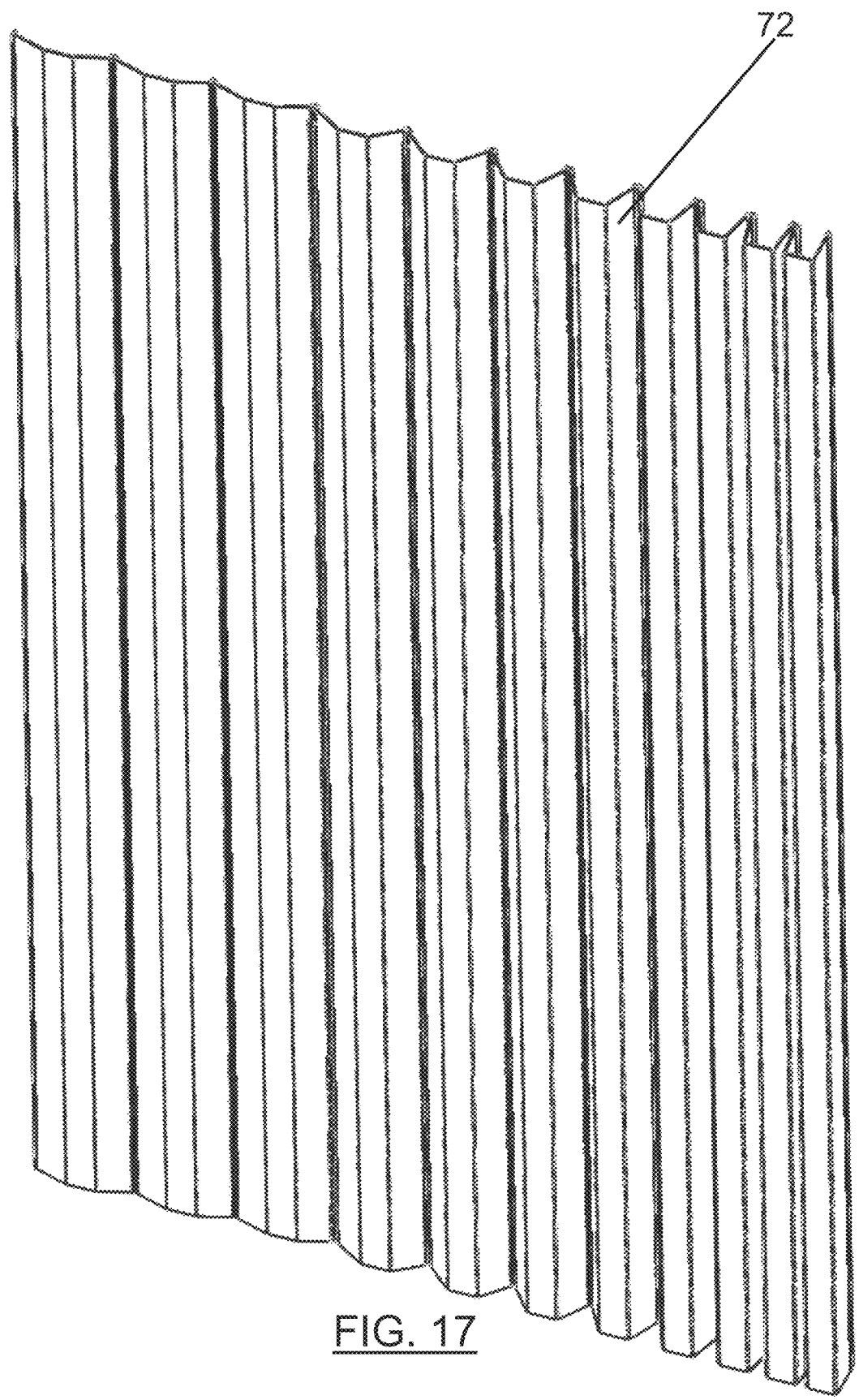
FIG. 17 depicts a section of a hanging wall that can change its spacing to allow for growth and to optimize the number of plants according to various embodiments described herein.
Figure 18:
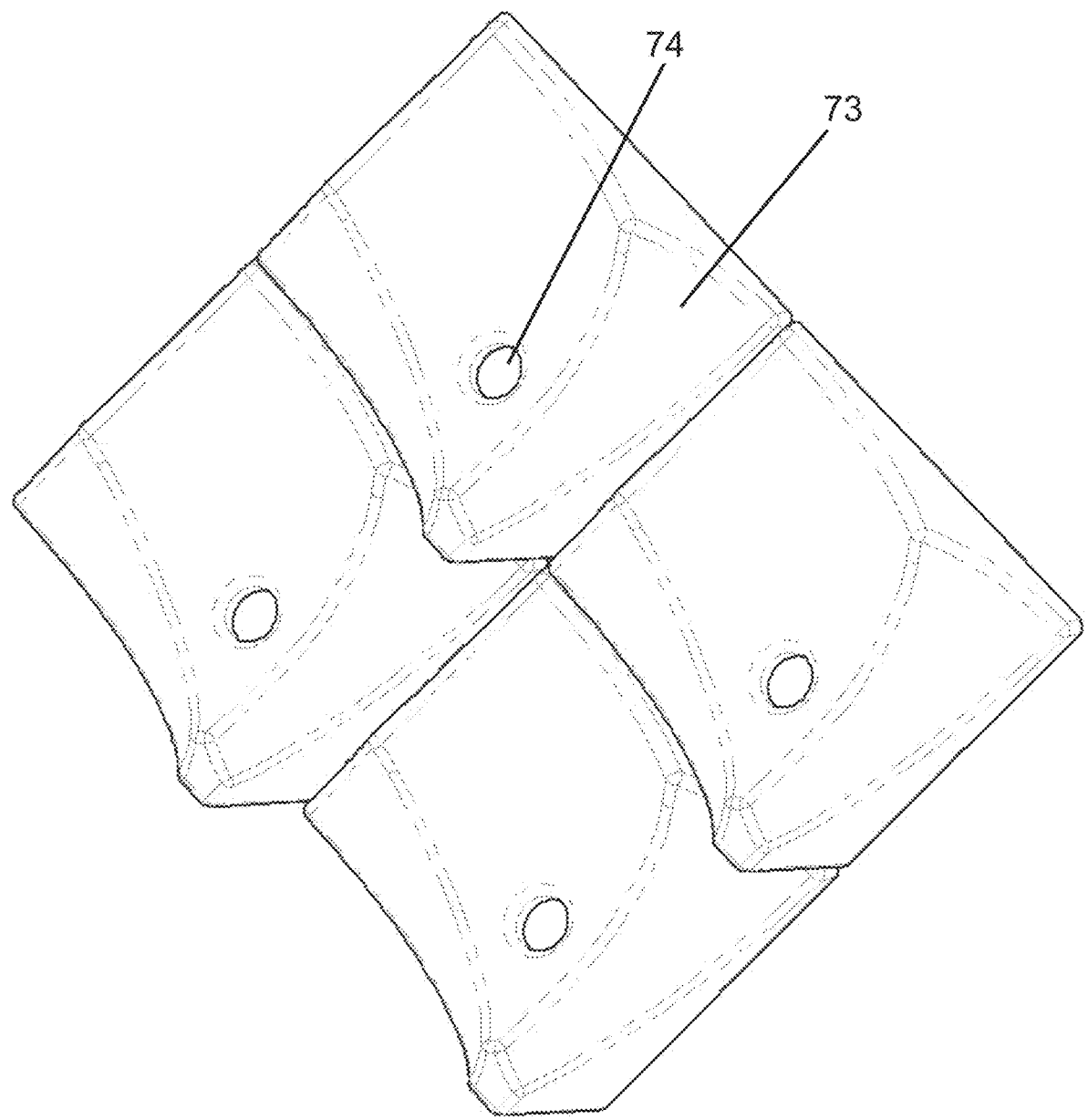
FIG. 18 depicts a curved version of a grow wall element according to various embodiments described herein.

The present invention will now be described referencing the appended figures representing preferred embodiments. FIG. 1 depicts two different vertical conveyor layouts. The grow lights (2) are arranged to allow for maximum exposure while the conveyors (1) are moving along their horizontal base. This shows how the depicted horizontal foundation conveyors can be placed very close to one another and can be serviced from the ends. This depiction shows conveyors (1) schematically as would contain the closely adjacent, movable grow supports vertically stacked (as shown in FIG. 3) such as the wall elements (3) shown in FIG. 2 which form the different selected growth phase maximal spatial density matrices (101) such as the first maturity growth phase maximal spatial density matrix (102) and the second maturity growth phase maximal spatial density matrix (103) each which move along their depicted circuitous paths by a continuous growth sequence support movement system (104) shown schematically in FIG. 3 so they pass a centralized supply (105) such as understood from FIGS. 11 & 12. FIG. 2 depicts several Wall Elements (3) which may be utilized as part of the moving conveyor system. These Wall Elements may be flat, curved to reflect the light, or may be some other complex geometry to facilitate light diffusion, plant angle, and layout, as shown in FIG. 18, and other requirements determined to enhance plant growth and planting density. FIG. 17 depicts a wall where the individual wall elements may be narrowed to accommodate young seedlings and then expanded as the plants grow larger. In one embodiment, this may allow for greater density as sections of the conveyor can be assigned plants in different stages of maturity, thus ensuring a continuous daily output. As an example, suppose a conveyor has 200 wall elements, each able to support 10 plants. The plants have a 20-day growth cycle. Then, to provide continuous output, 10 wall elements would have plants that are 1-day old, 10 wall elements would have plants that are 2 days old, etc. This arrangement may consistently yield 100 mature plants per day. This would also require that seed tray(s) (6), FIG. 5, be able to replace the 100 plants, and that they also be staged so that sufficient seed tray(s) may be available each day. In another embodiment the Wall Elements may be fixed in their spacing while providing the same ability to stagger a plants growth cycle over several Wall Elements to provide continuous output. FIG. 3 shows a preferred embodiment having six conveyors (1) arranged so that they can be accessed from the middle of a container. In this example, a 40-foot-high cube shipping container. Each may have an emergency water supply (4) and grow lights (2) and all may be serviced by a single propagation module (5). This may not exclude other embodiments where the number of conveyors, propagation modules and grow lights may be more or less, the number and orientation determined by the requirements of a particular system.

Figure 4:
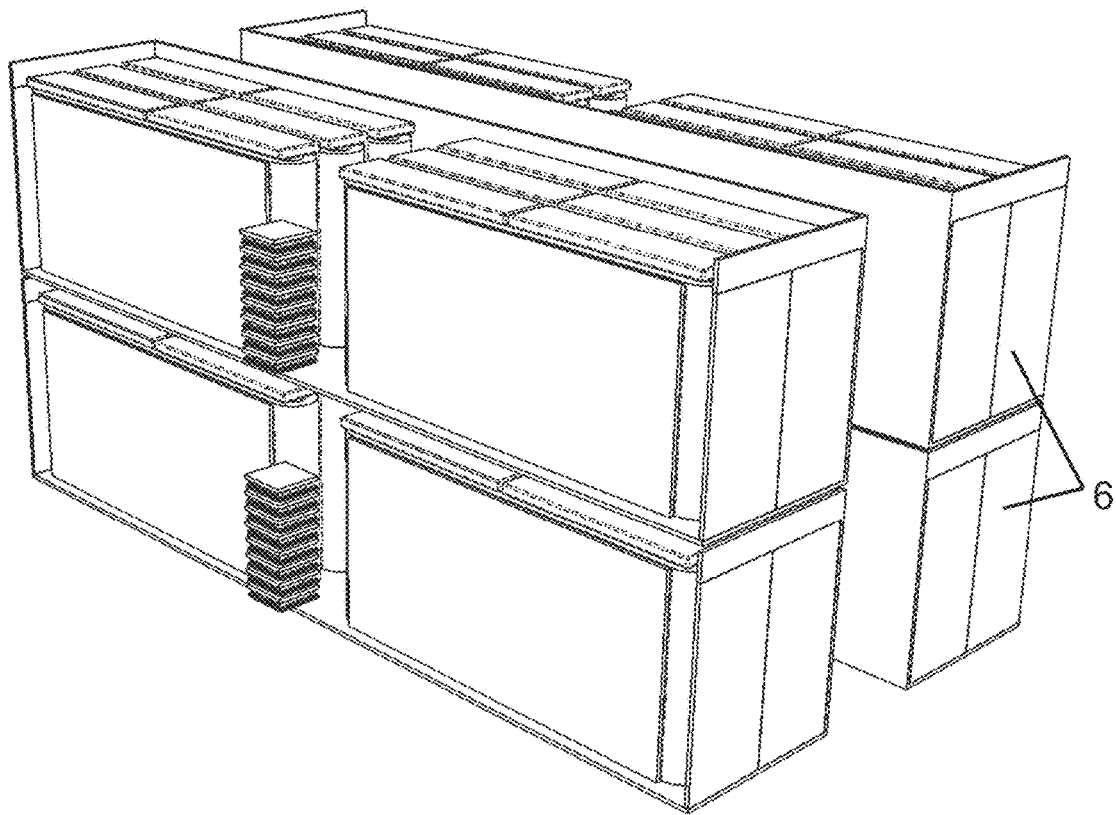
FIG. 4 depicts a factory arrangement of four stacked modules, as shown in FIG. 3, according to various embodiments described herein.

FIG. 4 shows the above shipping containers (6) stacked in rows to optimize floor space. They can be stacked up to the maximum load capacity of the containers utilized.

Figure 5:
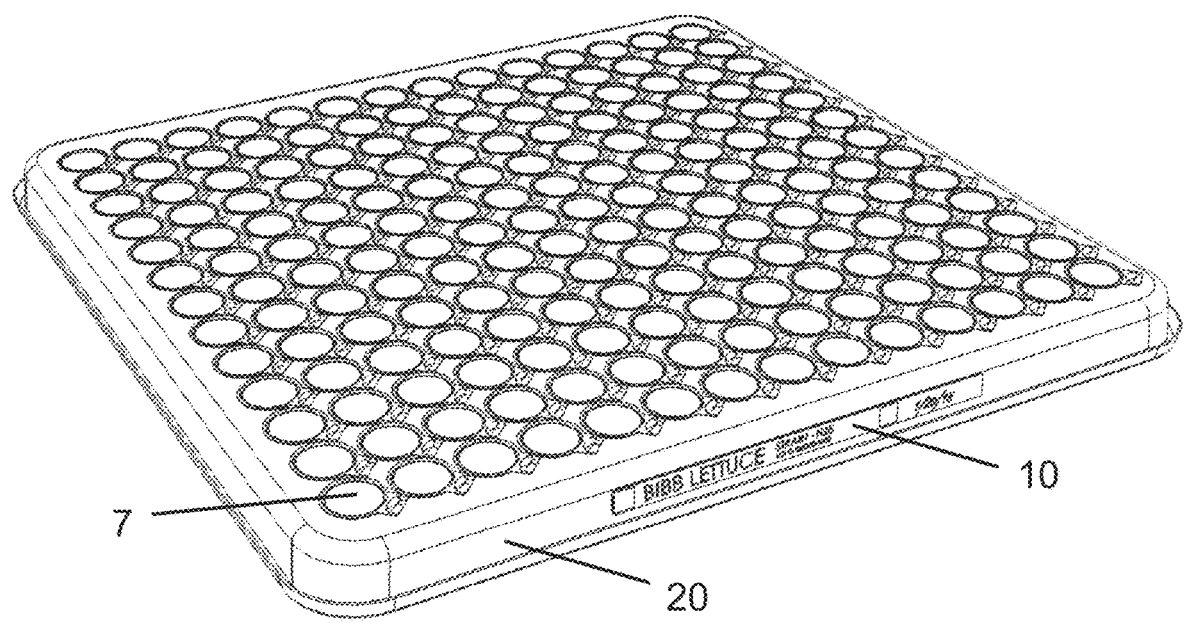
FIG. 5 depicts a seed tray according to various embodiments described herein.
Figure 6:
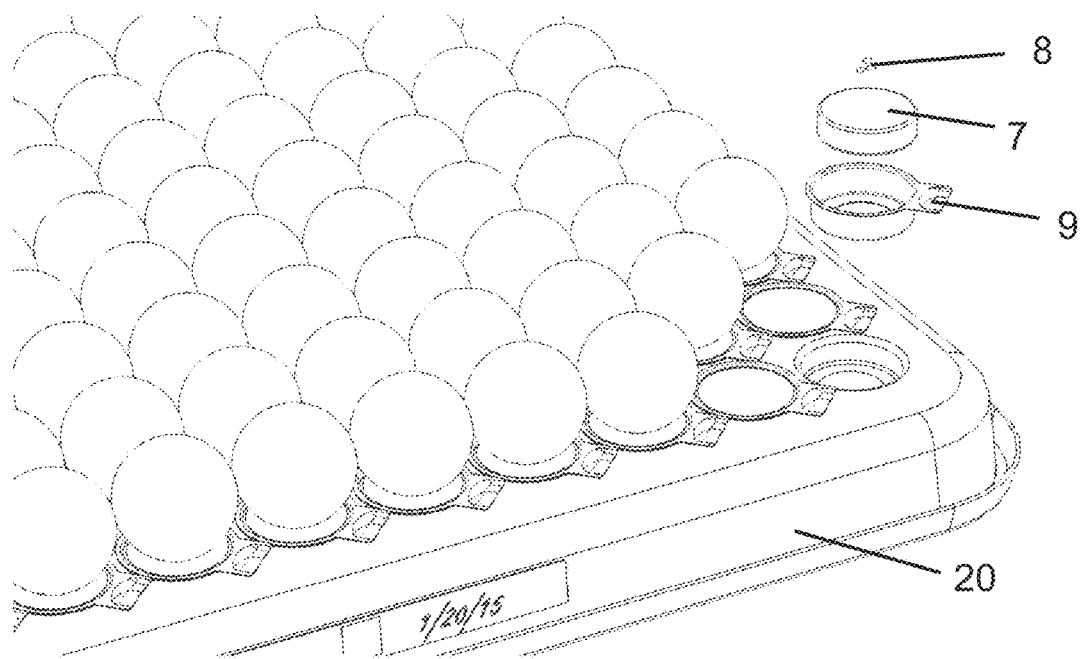
FIG. 6 depicts a close up of FIG. 5 showing a grow disk with seeds and a puck according to various embodiments described herein.

A second part of this invention is shown in FIG. 5. The molded seed tray (20) may be supplied with grow pods (7) in one embodiment. In another embodiment, the grow pods could be supplied separately. The label (10) may contain a unique identification such as a bar code, RFID chip, or other method of identification readable by the system so they may be used only once, if desired, identifying the seed type and specific grow conditions, which the system could use to tailor all factors required to optimize a given plant's taste, nutrient level, and weight. FIG. 6 shows the molded seed tray (20) with a number of grow pods (7) embedded with seeds (8). The grow pods (7) could be fabricated from a medium capable of allowing the roots of a seedling to penetrate it as a root penetration feature (106) and in element 9 of FIG. 6, and also to retain water to germinate the seeds. It could be retained in the seed tray (20) using a soluble adhesive for an adhesive attachment surface (107) or similar mechanical method such as the seed pucks (9) to allow it to be easily removed and inserted into a pod support (77), FIG. 19, which could then be placed into an engineered spot on a grow wall (72), grow tile (73), FIG. 17 and FIG. 18, or other holding device.

Figure 7:
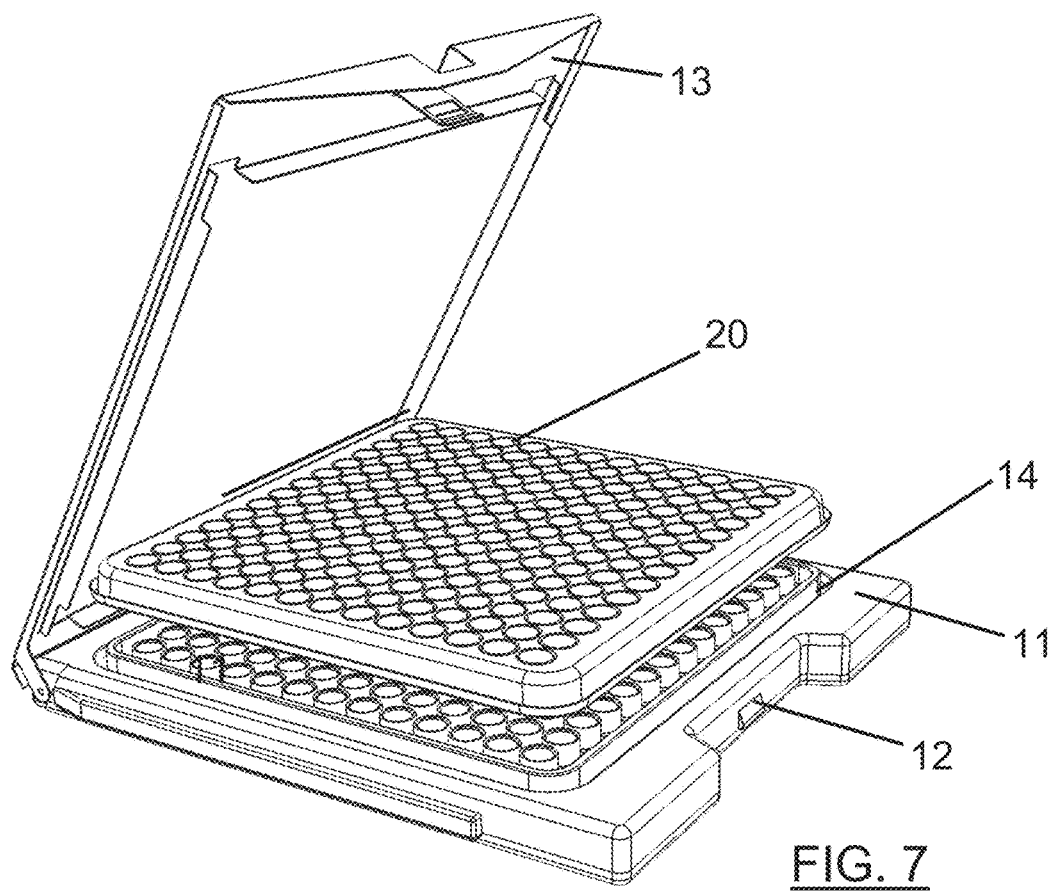
FIG. 7 depicts a Propagation Drawer with Seed Tray according to various embodiments described herein.
Figure 8:
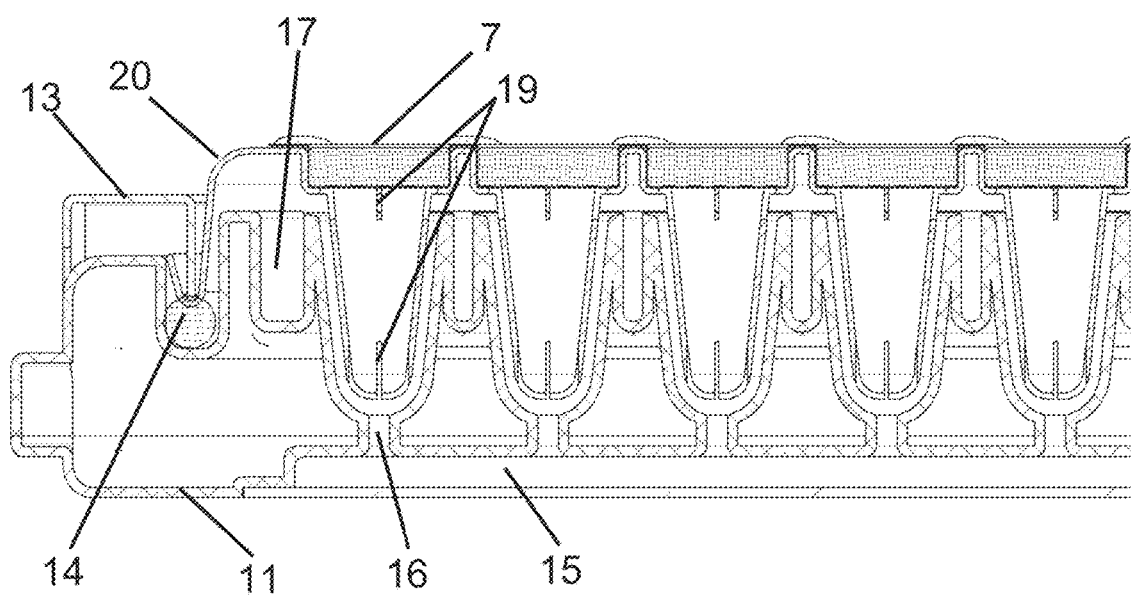
FIG. 8 depicts a cut away view of a Seed Tray in its use position in a Propagation Drawer with a water path according to various embodiments described herein.

In a third part of the invention the seed tray could be placed onto a propagation drawer (11), FIG. 7, and secured in place with a locking frame (13), sealing the seed tray against a flexible seal (14) using a latch (12) or other method to secure the seed tray. This may provide a water tight return passage for the nutrient enriched water. When the propagation drawer (11) is inserted into one of the sites on the propagation module (5) it could engage two infusion tubes, one input and one output, which may supply constantly recirculating water (15). In the case of the eight upper sites, see FIG. 10, this may moisten the seedling's roots by forcing fluid (15) up the channels (16), up through slots (19) in the seed tray (20), eventually overflowing into the return channels (17) to be removed by the second, output, tube. In one embodiment the lower two propagation drawer (11) sites, see FIG. 10, fluid could be periodically pulsed to force it up to the bottom of the grow pods to promote germination until roots formed. In other embodiments, the number and function of each "drawer" may be tailored to these or other functions required to propagate seeds, cuttings, grafts and other known methods commonly used to propagate new plants. This system could be hydroponic by design and the water would be circulated as required for optimum growth. The nutrient type and amount may be altered during different stages of the propagation of the seedlings and for different types of plants, perhaps automatically by an onboard program. This system could allow for small seedlings to be grown off the main system conveyors, which could then minimize the time required of this valuable resource, further reducing both the overall footprint and manpower required for a given output.

Figure 9:
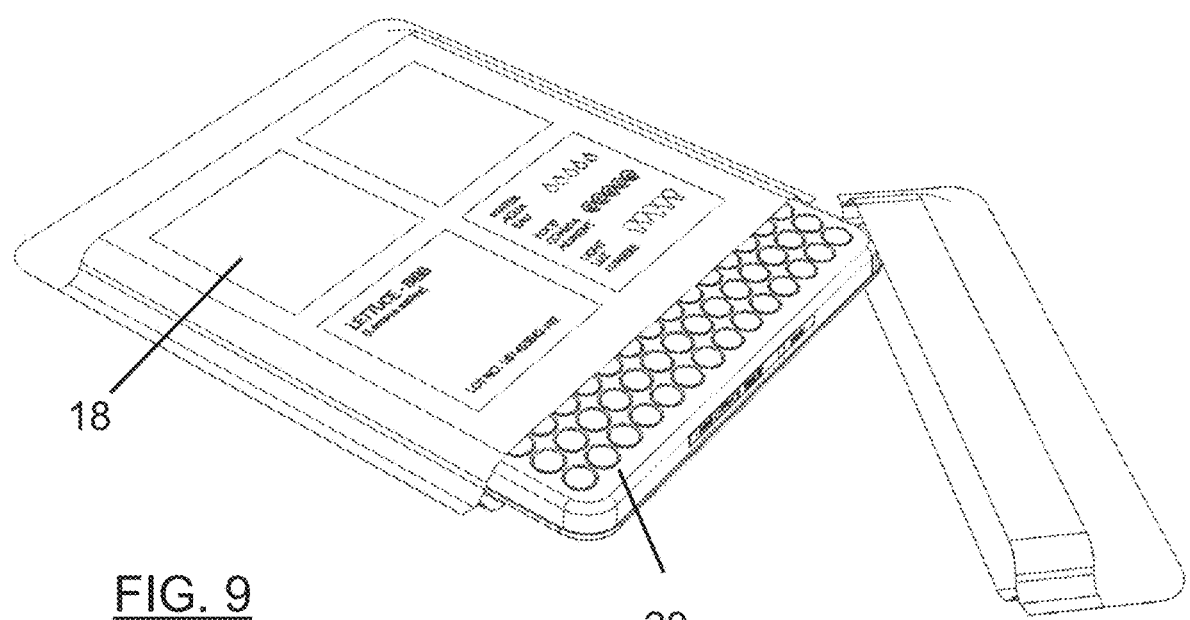
FIG. 9 depicts a Seed Tray in its Shipping Bag with plant type and growth settings displayed using pictography according to various embodiments described herein.

FIG. 9 shows the shipping bag (18) that the seed trays (6) may be shipped in. All information concerning the seeds type and growing requirements may be printed on the bag (18). This information may be presented using pictography or other graphic method, so no language skills would be required. Lot information could be displayed as well as any expiration dates. The bags may be gas and fluid-tight and may be filled with an inert gas to stabilize the seeds.

Figure 10:
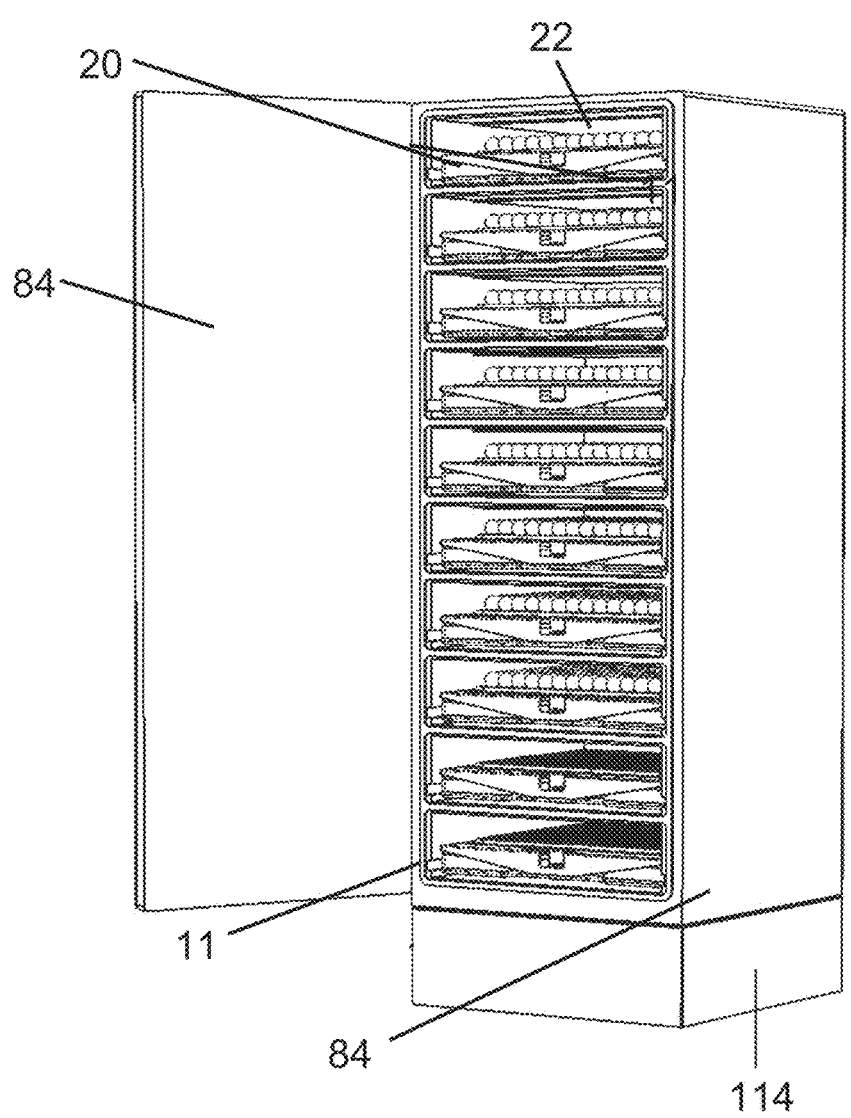
FIG. 10 depicts a typical stack up of Propagation Trays in the Propagation Module according to various embodiments described herein.

FIG. 10 shows how the propagation drawers would be situated in the propagation module (84). In one embodiment one or more drawers, corresponding to the first days when germination is happening, may have no LED panels (22) or other light source and could use nutrient-free water to merely moisten the grow pods. In further embodiment one or more drawers may have LED light panels (22), and in another embodiment the light source may be natural light or other suitable light source. The drawers may be supplied with nutrient- and oxygen-enriched water on a continuous basis, perhaps by using the hydroponic model. Each day one or more propagation drawers with the most mature seedlings could be removed and its seedlings may be used to repopulate the empty spots on a conveyor, empty spots which may be left when that day's harvest was removed, or at the start of a new grow cycle when some or all spots may be empty. A new propagation drawer with seeds could be placed in the first or germination drawer and all the other propagation drawers could be moved to the next propagation position. In the example shown in FIG. 10, ten days, represented by ten drawers, of the growth cycle for that particular plant will take place offline in the propagation module (114) which maintains the plants' propagation, two days in germination mode and eight days in seedling mode. In another embodiment a seed tray or seed sheet may contain several different types of plants. The selection and placement could be as provided by the manufacturer or created by the user. In another embodiment the number and orientation of the drawers may be different due to space and yield requirements.

Figure 11:
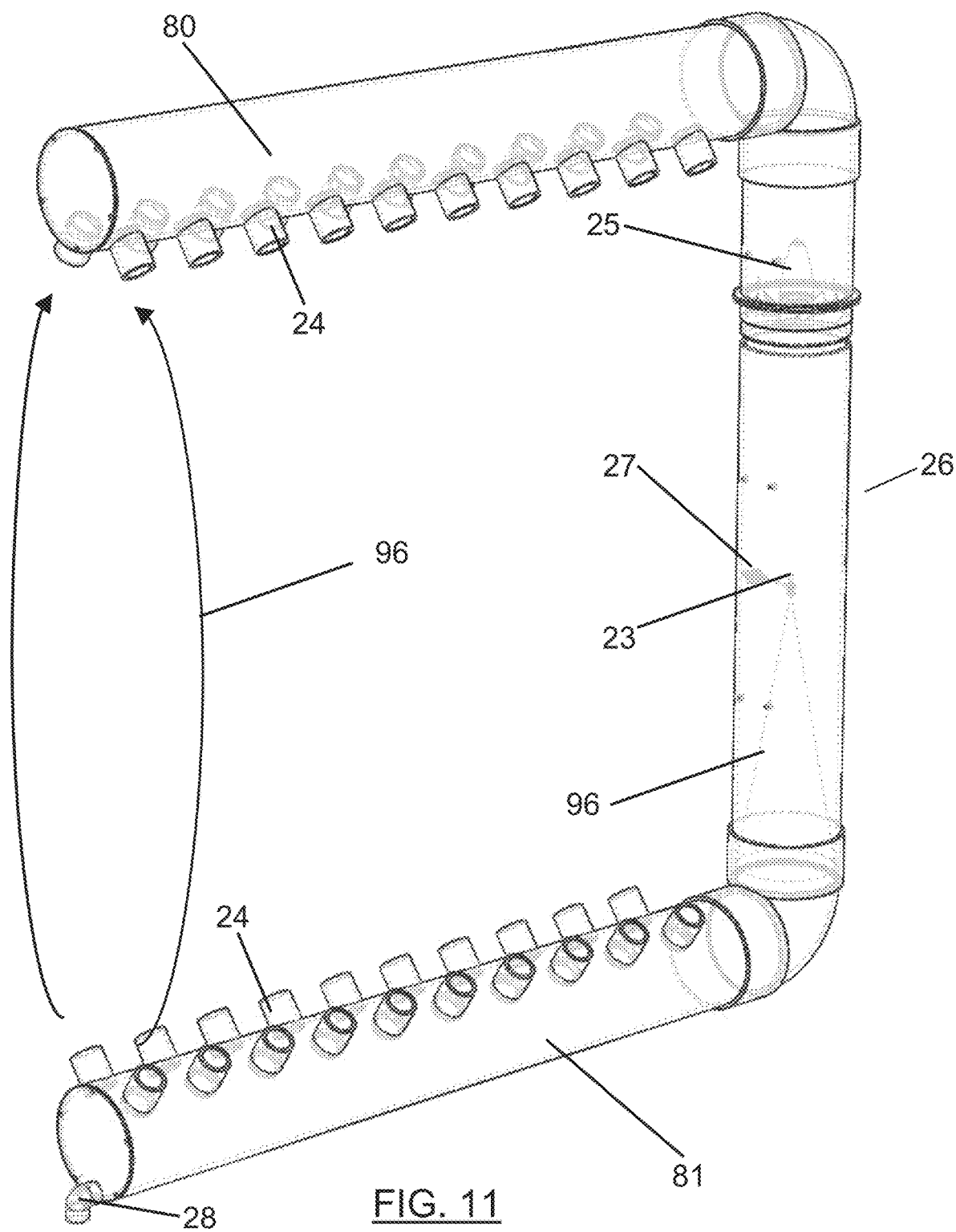
FIG. 11 depicts a misting element and mist pattern of a recirculating system according to various embodiments described herein.

FIG. 11 shows another embodiment of the invention, a closed loop misting system which may be a part of the conveyor systems described herein. In it, the misting nozzle/fogger (23) is inside a large diameter U-shaped chamber (26). Placed upstream and above it may be a fan (25). Just below the nozzle (23) is an oxygen injector (27). On both legs of the U-shaped chamber (26) are nozzle's bodies (24). The water mist (96) may be pulsed out of the injection nozzle (23) and driven into the retrieval nozzle body (80) so that a stream of the mist may be drawn across the roots of the plants. Any water that collects in the injection nozzle body (81) may be allowed to flow into the sump through a condensate tube (28) for collection and subsequent retrieval by the user or the retrieval tube (76) shown in FIG. 12. This may also apply to any excess water falling from the roots.

Figure 12:
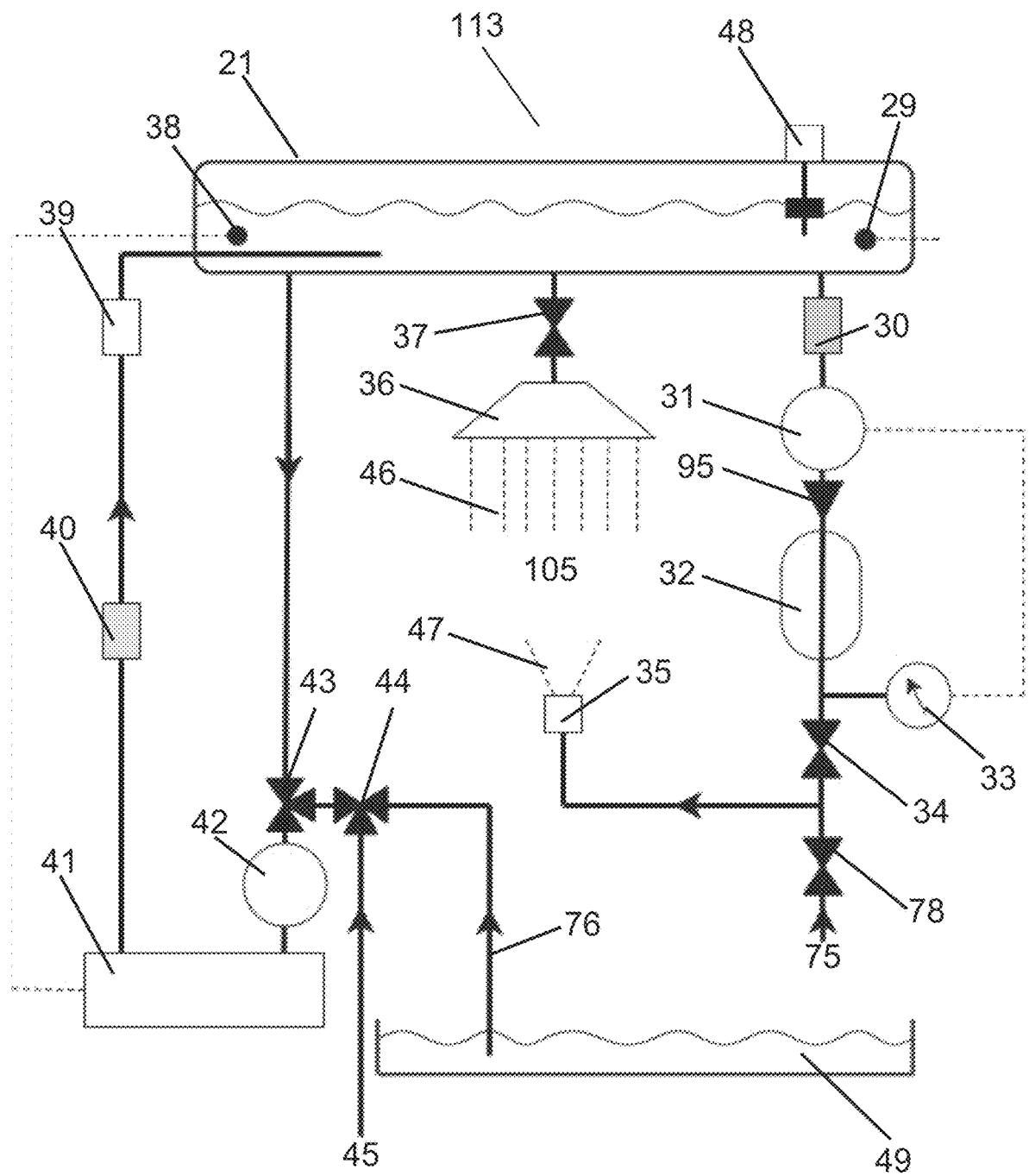
FIG. 12 depicts a fluidic schematic of a typical misting system according to various embodiments described herein.

FIG. 12 shows a schematic for an automated aeroponics irrigation system as a moisture supply system (113). The emergency tank (21) may be located above the grow area and may have sufficient capacity of nutrient-infused water to keep the roots of any given system moist for a period sufficient to affect any repairs to a failed main system or a power outage, which may last a minimum of 8 hours. The emergency tank (21) may be initially filled, and subsequently refilled as necessary by activating the three-way valves (43) and (44) so they connect the tank fill port (45) to the pump (42). A source of clean water at the proper pH level and with the appropriate amount of dissolved nutrients, not shown, may be attached to the tank fill port (45) and the pump (42) is activated. The chiller (41) may be energized with the purpose of maintaining the water at a temperature conducive to optimum root growth. Water may be pumped up to the emergency tank (21) passing through the primary 100 μ filter (40) and the UV sterilizing light (39). The chiller (41) is controlled by the temperature probe (38) residing in the emergency tank (21). When the emergency tank (21) is filled the liquid level sensor (48) may switch the three-way valve (43) to route the intake to the Pump (42) from the tank fill port (45) to the emergency tank (21), possibly creating a closed loop to maintain the water at a constant temperature and to assist in the mixing of the nutrients suspended in the water. When the system is under power the normally open two-way relief valve (37) will be closed. In the event of a power failure or a failure of the high-pressure pump (31) it may open, thus perhaps allowing nutrient infused water (46) to drip onto the roots through the shower head(s) (36) in a controlled manner. In one embodiment the water may be driven using stored pressure. In another embodiment the water may be driven by a battery powered pump. During operation, a parts-per-million nutrients meter (29) may assess the level of nutrients in the water. It may either inform the user when they are out of range, or control an automated system to add nutrients to a supply tank, not shown, attached to the tank fill port (45). Periodically during operation, the three-way valves (43) and (44) may be activated to connect the pump (42) to the sump (49) via the sump extraction tube (76) to remove any excess water which may have collected. During operation, the high-pressure pump (31) may draw water from the emergency tank (21) through the secondary 20 μFilter (30) to fill the accumulator (32) until its internal pressure reaches the correct level which may ensure a correct droplet size from the misting nozzle (35). It may be controlled by the pressure switch (33) and held at pressure once the high-pressure pump (31) is turned off using a one-way valve (95) and the normally closed two-way valve (34). When water is needed at the roots as determined by a software program the two-way valve (34) may be momentarily energized to allow the water under pressure to enter the nozzle(s) (35) to provide a 10 to 200 μ mist (47) to the roots of the plant(s). Periodically oxygen (75) may be released through the nozzle(s) (35) using the normally closed two-way valve (78).

Figure 13:
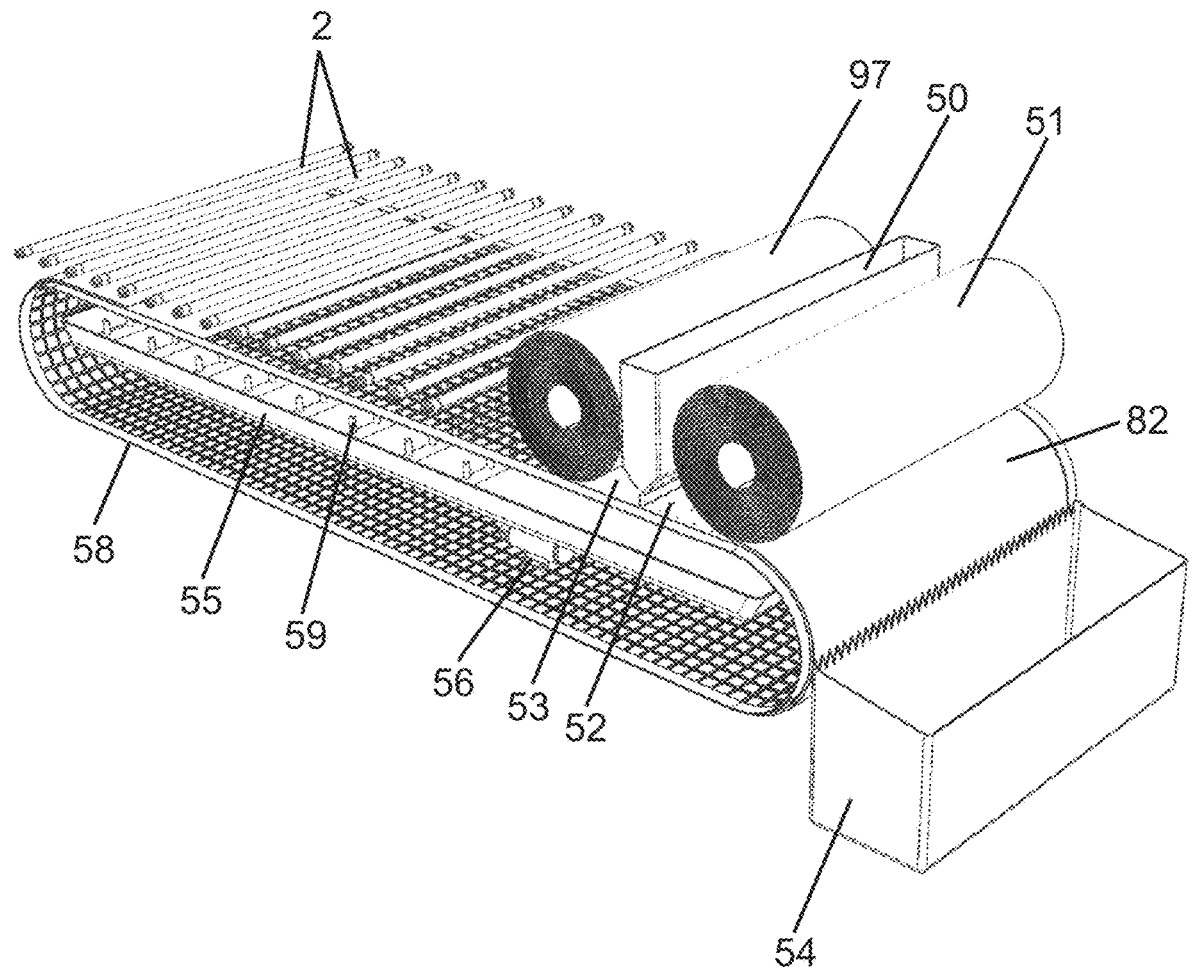
FIG. 13 depicts a horizontal conveyor system with automatic seed placement, grow matrix and covering elements according to various embodiments described herein.

FIG. 13 shows a horizontal Conveyor system with automatic planting, germinating and harvesting systems. The Growing Matrix (53) may be attached to the conveyor support mesh (58) which may be a stainless steel, plastic, or other porous belt material with openings to accommodate the eventual roots of the plants without allowing them to become attached, thus facilitating later removal of the plants and roots. This support mesh (58) may be driven in a CW rotation by a separate system, not shown. The growth matrix (53) can be attached to the support mesh (58) either by the user or by unrolling it from the roll (51) as the support mesh (58) moves past it. In one embodiment, this growth matrix (53) may have seeds embedded into it as supplied. In another embodiment, seeds (52) may be added to the growth matrix (53) by the seed feeder (50) after it is attached to the support mesh (58). If the seeds are added after, they may be held in place by biodegradable "glue"; or in another embodiment, a germination matrix (82) may be overlaid on the growth matrix (53) after the seeds have been dropped on it as illustrated from a roll (97). Once the seeds have germinated, the germination matrix (82) may be removed to allow for plant growth. The misting system (59) may have a pump (56) and a sump (55) extending beneath the entire conveyor length to allow it to capture any water that drips off the roots. The root side, perhaps being the interior of the conveyor, and the plant side, perhaps being the exterior, could be kept at different optimum temperatures. Harvesting may be achieved in one of several ways. In one embodiment, the entire growth matrix (53) with plants could be removed by the user. In another embodiment, the growth matrix could be left and the plants cut off and collected using an automatic harvester (54).

Figure 14:
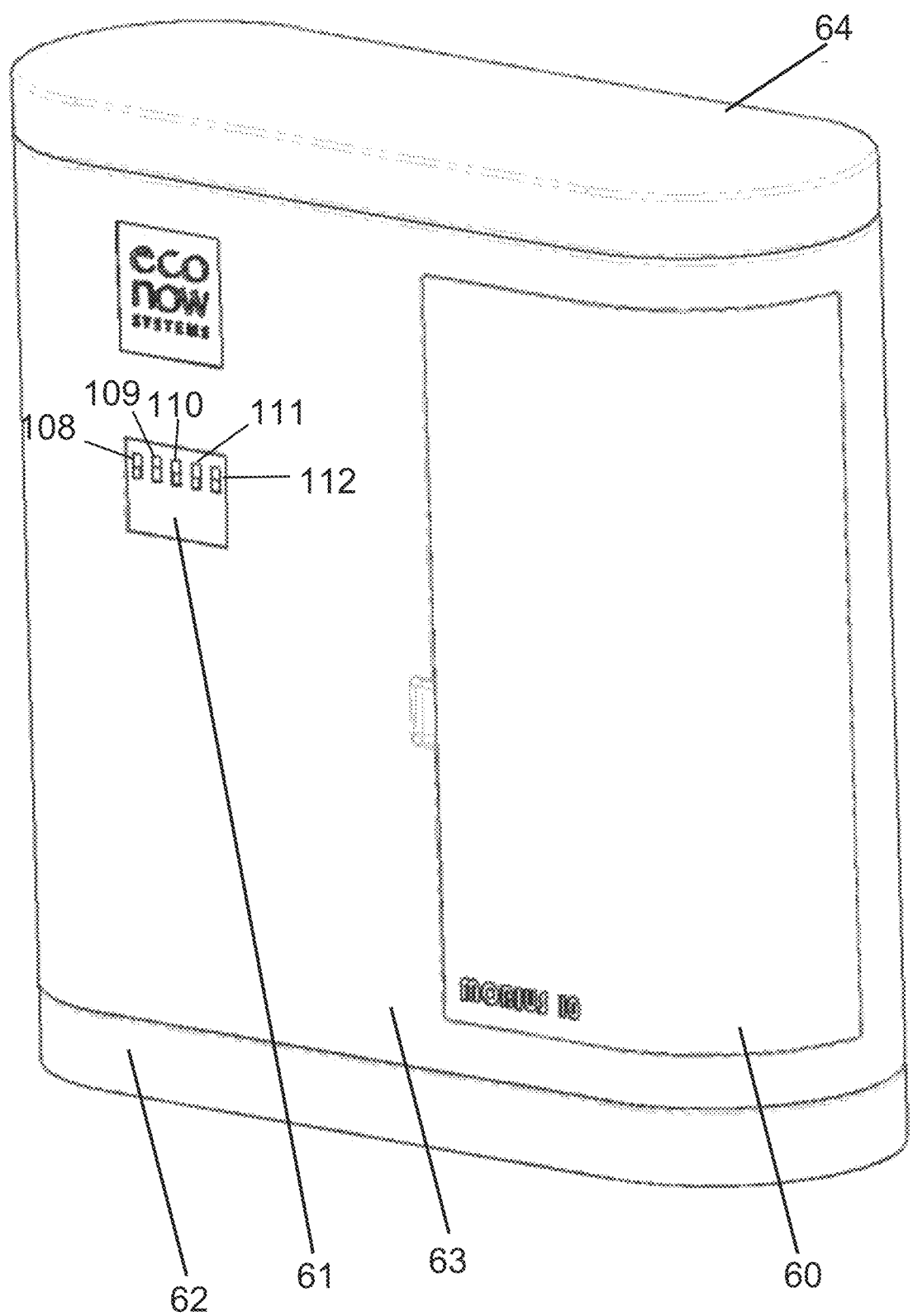
FIG. 14 depicts a single conveyor Growth Module according to various embodiments described herein.
Figure 15:
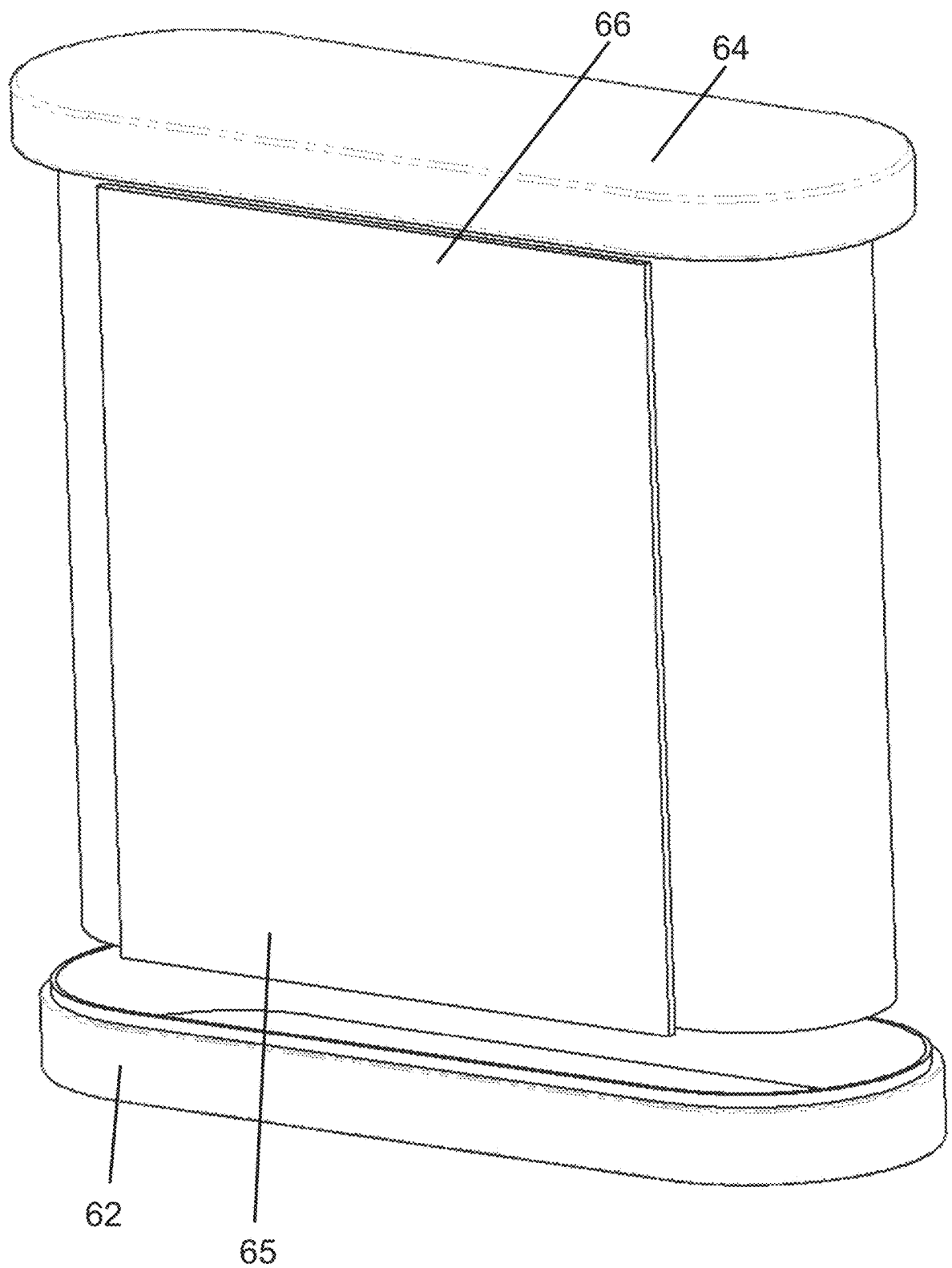
FIG. 15 depicts a single conveyor growth module with the covers removed according to various embodiments described herein.

FIGS. 14 and 15 show another embodiment of the invention using a single conveyor (66) with a light panel (65) enclosed in an insulated chamber (63). In one embodiment, this chamber (63) and the door (60) are fabricated using twin sheet thermoformed parts filed with insulating foam. They may also be fabricated using blow molding, rotational molding or other accepted method to insulate the interior. An emergency water tank (64) may form the top with all controls, pumps, sump, etc. located in the base (62). The system would be automatically controlled using a touch pad (61) and which can house a remote monitor (108), remote threshold set (109), remote adjustment (110), an internet of things (111), and cellular telephone control (112) systems.

Figure 16:
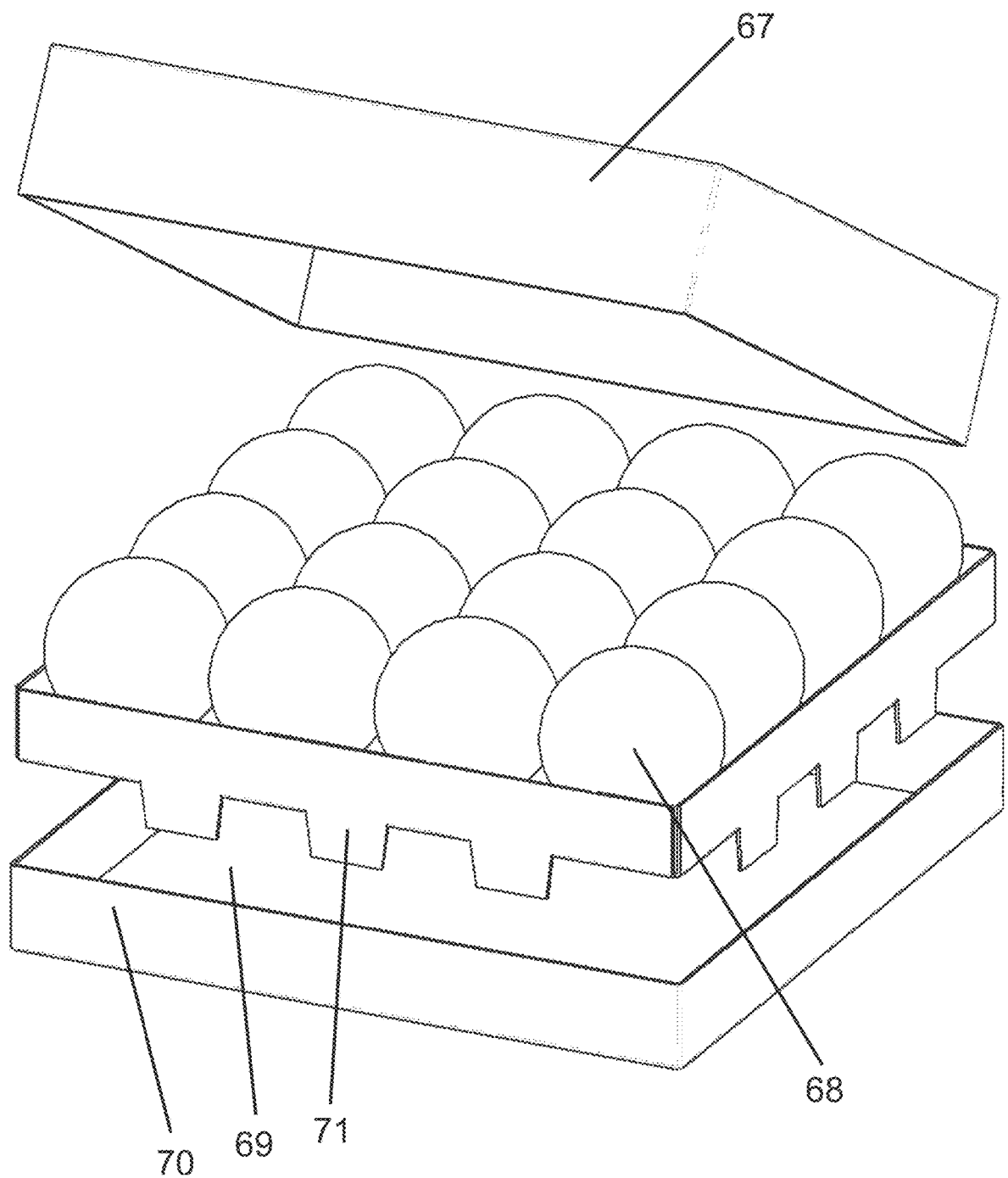
FIG. 16 depicts a recyclable shipping box for live plants according to various embodiments described herein.

FIG. 16 shows another embodiment of the invention, a shipping box used to ship live plants. The base (70) may have a moistened pad (69) as a moisture retention feature on which the plant's (68) roots would rest keeping them wetted. The insert (71) could be tailored to the plant type. The lid (67) could also be tailored to the plant size.

FIG. 17 shows another embodiment of the invention. The planting wall segments (72) may be designed to collapse to allow for closer spacing when the plants are immature. As they grow the panels (72) could be expanded to accommodate the increase in size. This could provide a 50% increase in planting area for a given system.

FIG. 18 shows another embodiment of the invention using individual formed planting panels (73) with openings (74) to accommodate planting seedlings. They are designed to reflect light directly onto the plants rather than back at the illumination source.

Figure 19:
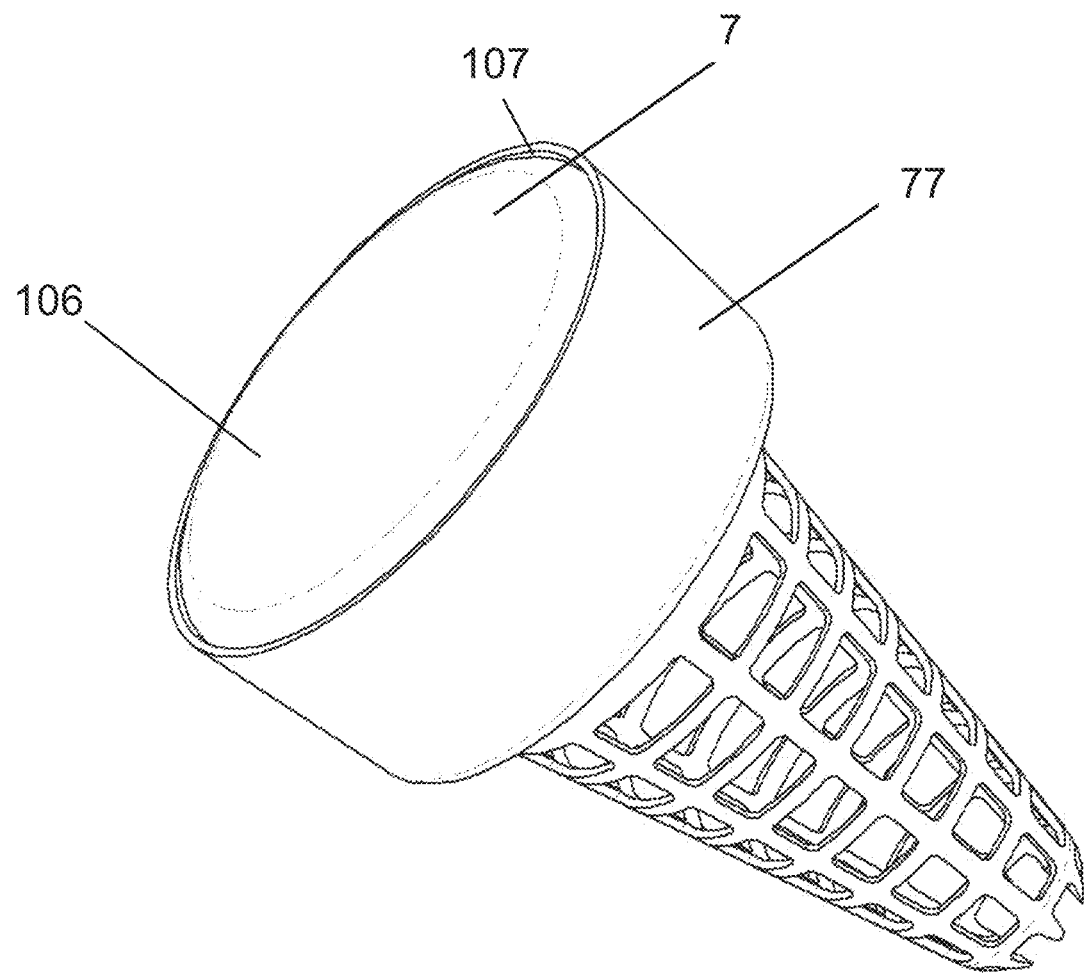
FIG. 19 depicts a grow pod (7) placed into a grow basket (77) for easy transfer to a grow wall.

FIG. 19 shows another embodiment of the invention where the Grow Pods (7) may be inserted into a Pod Support (77) which is configured to support the roots and to easily be inserted into a pocket for use on any of the aforementioned Wall elements for easy insertion and removal and eventual placement in Shipping Boxes, FIG. 16.

Figure 20:
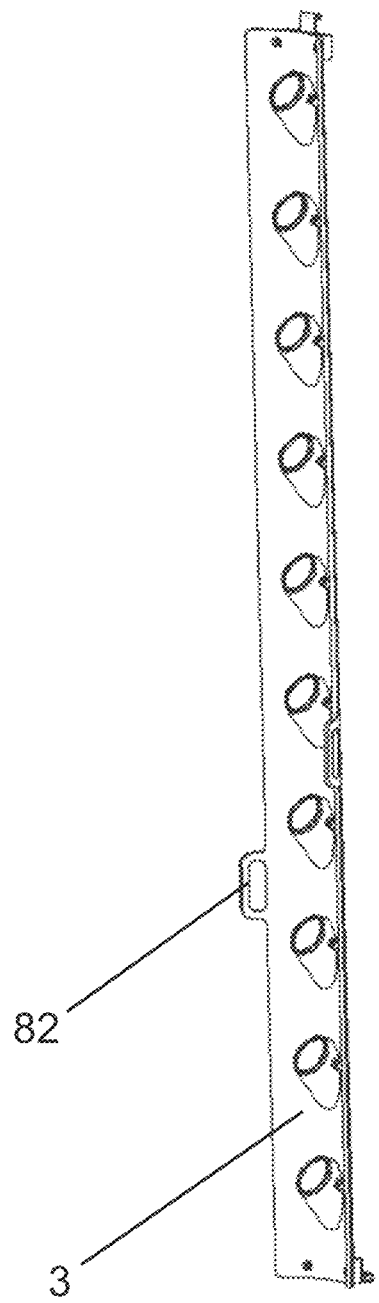
FIG. 20 depicts a single grow wall (3) element fabricated from a PVC tube. Individual pod supports (80) are mounted to the surface at spacing specific to a particular plant type.

FIG. 20 shows one embodiment of the Wall Elements (3). This Wall Element can be designed with handholds (80) to easily insert and remove it for harvesting, replanting and maintenance.

Figures 21, 22:
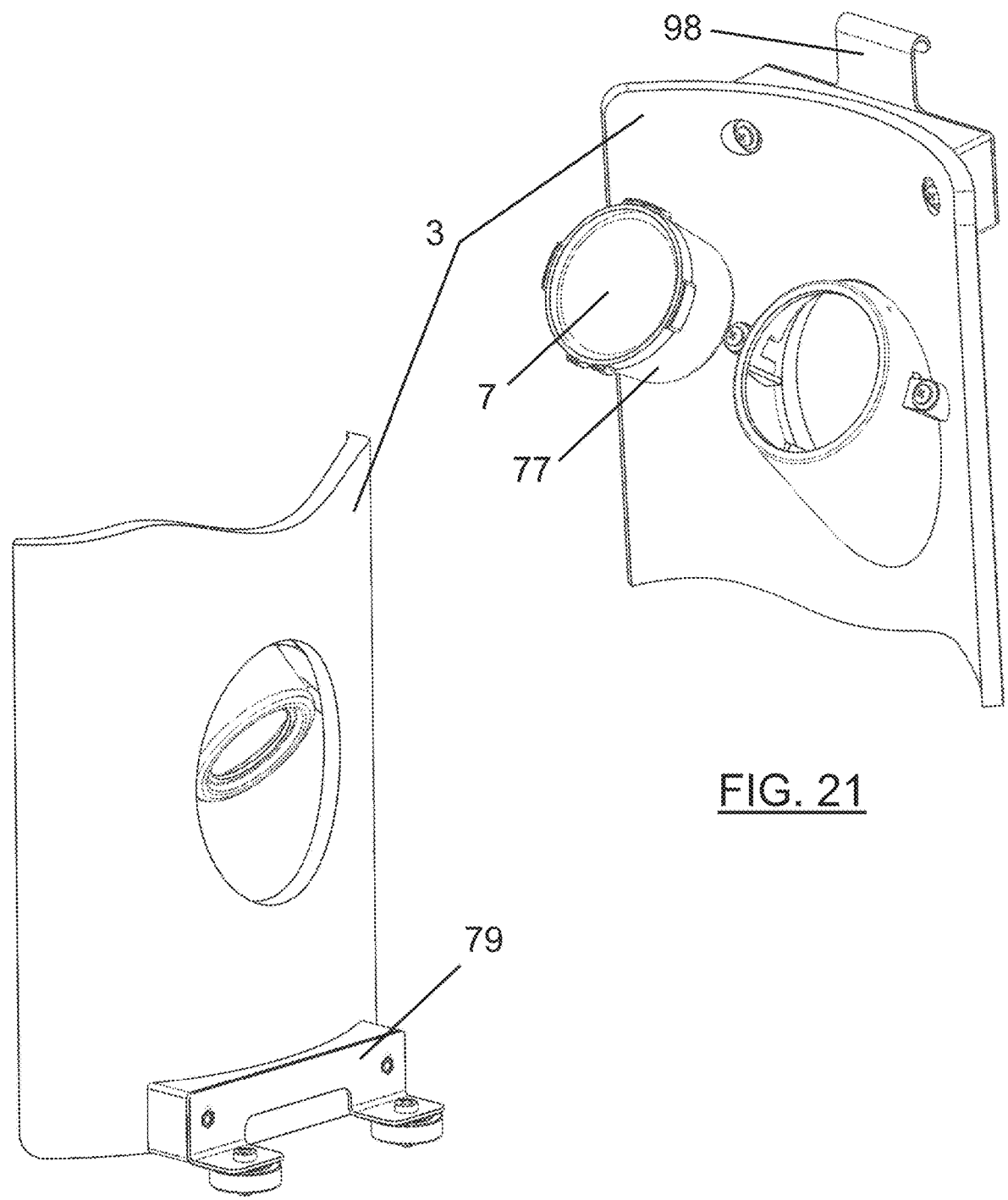
FIG. 21 depicts a wall element (3) with a hanger (98) mounted to the top. It also shows a grow pod mounted in a Grow Puck.
FIG. 22 shows a wall element with a roller guide mounted to its lower edge.

FIG. 21 shows one embodiment of a mounting system. A Hanger (98) is attached to the upper section of a wall element (3). A wall element (3) could be lifted by the user and placed on a mounting point on a conveyor (1).

FIG. 22 shows one embodiment of a mounting system. A guide roller (79) may be attached to the lower section of a wall element (3). A wall element (3) would be lifted by the user and the guide rollers would be placed in a guide channel, not shown, which would be a part of a conveyor (1).

Figure 23:
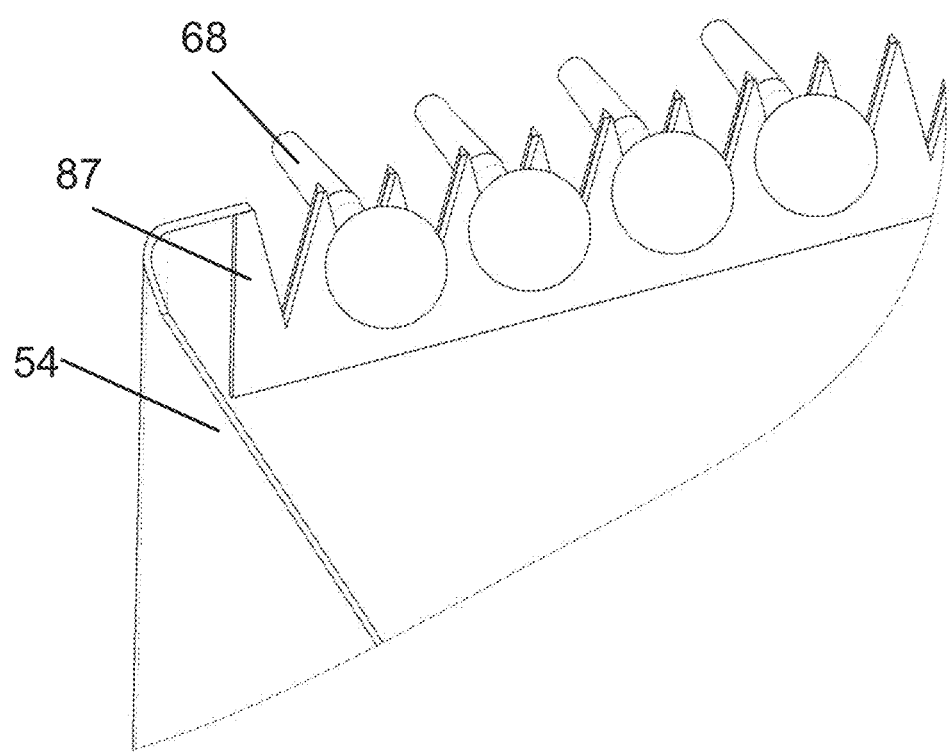
FIG. 23 shows a harvester with a reciprocating cutoff blade

FIG. 23 shows one embodiment for trimming mature plants (68) on a Horizontal Conveyor. A row of Plants (68) embedded in the Growth Matrix (53), not shown, moves into the Cutting teeth located on the Harvester (54). A reciprocating cutting Blade (87) cuts through the roots allowing the Plants to fall into the Harvester.

While the invention has been described in connection with some preferred embodiments, it is not intended to limit the scope of the invention to the particular form set forth, but on the contrary, it is intended to cover such alternatives, modifications, and equivalents as may be included within the spirit and scope of the invention as defined by the statements of inventions. Examples of alternative claims may include:

1. A self-contained, compact plant growth system comprising:
   an external enclosure;
   a plurality of closely adjacent, movable grow supports having multiple plant placement locations;
   a plurality of individual plant growth foundations configured to be placed at each of said multiple plant placement locations and to hold plants;
   a circuitous path support movement system to which said plurality of closely adjacent, movable grow supports are movably responsive;
   a centralized plant water supply system configured to supply water for release to each of said multiple plant placement locations on said plurality of closely adjacent, movable grow supports as they pass said centralized supply;
   a nutrient supply system configured to supply nutrients for release to said multiple plant placement locations on said plurality of closely adjacent, movable grow supports; and
   a distributed light supply system configured to supply select wave lengths of light to each of said multiple plant placement locations on said plurality of closely adjacent, movable grow supports.

2. A self-contained compact plant growth system as described in clause 1 or any other clause and further comprising an emergency water supply system configured to supply water during a power loss to each of said multiple plant placement locations on said plurality of closely adjacent, movable grow supports.

3. A self-contained compact plant growth system as described in clause 2 or any other clause wherein said emergency water supply system configured to supply water during a power loss to each of said multiple plant placement locations on said plurality of closely adjacent, movable grow supports comprises a gravity fed emergency water supply system.

4. A self-contained compact plant growth system as described in clause 2 or any other clause wherein said emergency water supply system configured to supply water during a power loss to each of said multiple plant placement locations on said plurality of closely adjacent, movable grow supports comprises a stored water pressure emergency water supply system.

5. A self-contained compact plant growth system as described in clause 2 or any other clause wherein said emergency water supply system configured to supply water during a power loss to each of said multiple plant placement locations on said plurality of closely adjacent, movable grow supports comprises a stored electrical power emergency water supply system.

6. A self-contained compact plant growth system as described in clause 1 or any other clause and further comprising a decentralized plant water supply system configured to supply water to all of said multiple plant placement locations on said plurality of closely adjacent, movable grow supports at regular intervals.

7. A self-contained compact plant growth system as described in clause 1 or any other clause wherein said centralized plant water supply system contains water, and further comprising a pH tester responsive to said water from said centralized plant water supply system.

8. A self-contained compact plant growth system as described in clause 1 or any other clause wherein said centralized plant water supply system contains water, and further comprising a nutrient parameter tester responsive to said water from said centralized plant water supply system.

9. A self-contained compact plant growth system as described in clause 1 or any other clause wherein said centralized plant water supply system contains water, and further comprising an automatic pH adjustment input to which said water from said centralized plant water supply system is responsive.

10. A self-contained compact plant growth system as described in clause 1 or any other clause wherein said centralized plant water supply system contains water, and further comprising an automatic nutrient adjustment input to which said water from said centralized plant water supply system is responsive.

11. A self-contained compact plant growth system as described in clause 1 or any other clause and further comprising an automatic plant side air temperature adjustment input configured to act on the plant side of said plurality of closely adjacent, movable grow supports.

12. A self-contained compact plant growth system as described in clause 1 or any other clause and further comprising an automatic root side air temperature adjustment input configured to act on the root side of said plurality of closely adjacent, movable grow supports.

13. A self-contained compact plant growth system as described in clause 11 or any other clause and further comprising an automatic root side air temperature adjustment input configured to act on the root side of said plurality of closely adjacent, movable grow supports, and wherein said automatic plant side air temperature adjustment input configured to act on the plant side of said plurality of closely adjacent, movable grow supports is independent of said automatic root side air temperature adjustment input configured to act on the root side of said plurality of closely adjacent, movable grow supports.

14. A self-contained compact plant growth system as described in clause 1 or any other clause and further comprising an automatic plant side air content adjustment input configured to act on the plant side of said plurality of closely adjacent, movable grow supports.

15. A self-contained compact plant growth system as described in clause 1 or any other clause and further comprising an automatic root side air content adjustment input configured to act on the root side of said plurality of closely adjacent, movable grow supports.

16. A self-contained compact plant growth system as described in clause 14 or any other clause and further comprising an automatic root side air content adjustment input configured to act on the root side of said plurality of closely adjacent, movable grow supports, and wherein said automatic plant side air content adjustment input configured to act on the plant side of said plurality of closely adjacent, movable grow supports is independent of said automatic root side air content adjustment input configured to act on the root side of said plurality of closely adjacent, movable grow supports.

17. A self-contained compact plant growth system as described in clause 16 or any other clause wherein said automatic root side air content adjustment input configured to act on the root side of said plurality of closely adjacent, movable grow supports comprises an automatic root side oxygen adjustment input, and wherein said automatic plant side air content adjustment input configured to act on the plant side of said plurality of closely adjacent, movable grow supports comprises an independent automatic plant side carbon dioxide adjustment input.
18. A self-contained compact plant growth system as described in clause 1 or any other clause wherein said plurality of closely adjacent, movable grow supports comprise collapsible grow supports configured to collapse to a smaller width for seedlings and expand as plants mature in size to allow for more system capacity, and further comprising a grow support expansion mechanism configured to open a plurality of said collapsible grow supports incrementally between a minimum opening and a maximum opening to accommodate plant size changes.
19. A self-contained compact plant growth system as described in clause 1 or any other clause wherein said plurality of closely adjacent, movable grow supports comprise reconfigurable closely adjacent, movable grow supports capable of accommodating different plant types, sizes, and planting density.
20. A self-contained compact plant growth system as described in clause 1 or any other clause and further comprising a microbial growth control system configured to impact a portion of plants held by said closely adjacent, movable grow supports when said circuitous path support movement system acts adjacent said plurality of closely adjacent, movable grow supports, and configured so as to expose all said plants as they pass said microbial growth control system.
21. A self-contained compact plant growth system as described in clause 20 or any other clause wherein said microbial growth control system configured to impact a portion of said plants held by said closely adjacent, movable grow supports when said circuitous path support movement system acts upon said plurality of closely adjacent, movable grow supports, and configured so as to expose all said plants as they pass said microbial growth control system comprises ultraviolet lights configured such that movement of said plurality of closely adjacent, movable grow platforms exposes all said plants as they pass said ultraviolet lights.
22. A self-contained compact plant growth system as described in clause 1 or any other clause wherein said plurality of individual plant growth foundations configured to be placed at each of said multiple plant placement locations and to hold plants comprise a plurality of removable-reusable individual plant growth foundations configured to be placed at each of said multiple plant placement locations and to hold said plants.
23. A self-contained compact plant growth system as described in clause 1 or any other clause wherein said plurality of closely adjacent, movable grow supports comprise extended vine grow supports.
24. A self-contained compact plant growth system as described in clause 1 or any other clause wherein said plurality of individual plant growth foundations configured to be placed at each of said multiple plant placement locations and to hold plants comprises a plurality of rigid mechanically sustaining plant foundations.
25. A self-contained compact plant growth system as described in clause 1 or any other clause wherein said plurality of individual plant growth foundations configured to be placed at each of said multiple plant placement locations and to hold plants comprises a plurality of rigid mechanically sustaining root foundations.
26. A self-contained compact plant growth system as described in clause 1 or any other clause wherein said plurality of individual plant growth foundations configured to be placed at each of said multiple plant placement locations and to hold plants comprises a plurality of flexible, porous mechanically sustaining plant foundations.
27. A self-contained compact plant growth system as described in clause 1 or any other clause wherein said plurality of individual plant growth foundations configured to be placed at each of said multiple plant placement locations and to hold plants comprises a plurality of flexible, porous mechanically sustaining root foundations.
28. A self-contained compact plant growth system as described in clause 1 or any other clause wherein said plurality of individual plant growth foundations configured to be placed at each of said multiple plant placement locations and to hold plants comprises a plurality of multi-layer woven material seed capture strips attached to each other to secure layers with seeds within.
29. A self-contained compact plant growth system as described in clause 1 or any other clause wherein said plurality of individual plant growth foundations configured to be placed at each of said multiple plant placement locations and to hold plants comprises a single-layer woven material seed capture strip; and further comprising a soluble non-toxic seed adhesive at at least some locations on said single-layer woven material seed capture strip.
30. A self-contained compact seed propagation system comprising:
an external enclosure;
a plurality of removable trays configured to hold individual seed pods at plant locations;
a moisture supply system to which said plant locations on said removable trays is responsive;
a propagation maintenance system configured to maintain said plant locations at optimum propagation conditions.
31. A self-contained compact seed propagation system as described in clause 30 wherein said propagation maintenance system configured to maintain said plant locations at optimum propagation conditions comprises a propagation maintenance system configured to maintain said plant locations at optimum propagation conditions selected from group consisting of:
a light maintenance system configured to maintain said plant locations at optimum light conditions;
a temperature maintenance system configured to maintain said plant locations at optimum temperature conditions;
a humidity maintenance system configured to maintain said plant locations at optimum humidity conditions;
a water maintenance system configured to maintain said plant locations at optimum water conditions;
an oxygen maintenance system configured to maintain said plant locations at optimum oxygen conditions;
a carbon dioxide maintenance system configured to maintain said plant locations at optimum carbon dioxide conditions;
a nutrient maintenance system configured to maintain said plant locations at optimum nutrient conditions; and
any combinations of the above, each without limiting additional elements.
32. A self-contained compact seed propagation system comprising:
an external enclosure;
a plurality of removable trays configured to hold individual prepackaged seed trays having plant locations;
a moisture supply system to which said plant locations on said removable trays is responsive;

a propagation maintenance system configured to maintain said plant locations at optimum propagation conditions.

33. A self-contained compact seed propagation system as described in clause 32 or any other clause wherein said propagation maintenance system configured to maintain said plant locations at optimum propagation conditions comprises a propagation maintenance system configured to maintain said plant locations at optimum propagation conditions selected from group consisting of:
a light maintenance system configured to maintain said plant locations at optimum light conditions;
a temperature maintenance system configured to maintain said plant locations at optimum temperature conditions;
a humidity maintenance system configured to maintain said plant locations at optimum humidity conditions;
a water maintenance system configured to maintain said plant locations at optimum water conditions;
an oxygen maintenance system configured to maintain said plant locations at optimum oxygen conditions;
a carbon dioxide maintenance system configured to maintain said plant locations at optimum carbon dioxide conditions;
a nutrient maintenance system configured to maintain said plant locations at optimum nutrient conditions; and
any combinations of the above, each without limiting additional elements.

34. A method of compact aeroponic plant production comprising the steps of:
establishing one or more plants at a growth foundation;
placing a plurality of said plants at a growth foundation on a movable grow support;
circuitously moving said movable grow support along a repetitive path;
subjecting at least a portion of said plants to a plant's source of water mist at least for a portion of the time said plants circuitously move in response to said movable grow support;
subjecting at least a portion of said plants to a plant's source of nutrients at least for a portion of the time said plants circuitously move in response to said movable grow support;
subjecting at least a portion of said plants to a plant's source of light at least for a portion of the time said plants circuitously move in response to said movable grow support; and
externally enclosing said plurality of plants, said movable grow support, said plant's source of water mist, said plant's source of nutrients, and said plant's source of light within an external enclosure during a period of growth for said plants.

35. A system substantially as herein described with reference to any one or more of the figures and description.

36. A self-contained compact plant growth system as described in clause 1 or any other clause wherein said plurality of closely adjacent, movable grow supports comprises an overlapping, selected growth phase maximal spatial density matrix of closely adjacent, movable grow supports.

37. A self-contained compact plant growth system as described in clause 36 wherein said overlapping, selected growth phase maximal spatial density matrix of closely adjacent, movable grow supports comprises:
a first growth phase maximal spatial density matrix of closely adjacent, movable grow supports; and
a second growth phase maximal spatial density matrix of closely adjacent, movable grow supports.

38. A self-contained compact plant growth system as described in clause 37 or any other clause wherein said first growth phase maximal spatial density matrix of closely adjacent, movable grow supports comprises a plurality of vertically stacked, horizontal foundation closely adjacent, movable grow supports.

39. A self-contained compact plant growth system as described in clause 37 or any other clause wherein said second growth phase maximal spatial density matrix of closely adjacent, movable grow supports comprises a plurality of horizontally stacked, vertical foundation closely adjacent, movable grow supports.

40. A self-contained compact plant growth system as described in clause 38 or any other clause wherein said first growth phase maximal spatial density matrix of closely adjacent, movable grow supports comprises a fixed horizontal planar pod support matrix of closely adjacent, movable grow supports.

41. A self-contained compact plant growth system as described in clause 39 or any other clause wherein said second growth phase maximal spatial density matrix of closely adjacent, movable grow supports comprises a plurality of vertically pivotable, vertical plant growth row supports.

42. A self-contained compact plant growth system as described in clause 1 wherein said circuitous path support movement system to which said plurality of closely adjacent, movable grow supports are movably responsive comprises a continuous growth sequence movement system.

43. A self-contained compact plant growth system as described in clause 42 or any other clause wherein said continuous growth sequence movement system comprises an adjacent, parallel output grown plant extraction system.

44. A self-contained compact plant growth system as described in clause 43 or any other clause wherein said external enclosure comprises a common side plant multiple movement system output.

45. A self-contained compact plant growth system as described in clause 1 or any other clause wherein said plurality of closely adjacent, movable grow supports comprises a root exposure portion opposite a plant exposure portion.

46. A self-contained compact plant growth system as described in clause 45 or any other clause wherein said root exposure portion opposite a plant exposure portion comprises a root to root adjacent growth exposure system and a plant to plant adjacent growth exposure system.

47. A self-contained compact plant growth system as described in clause 1 or any other clause and further comprising a self-contained power system to which said external enclosure is subject.

48. A self-contained compact plant growth system as described in clause 47 wherein said self-contained power system to which said external enclosure is subject comprises a self-contained power system selected from a group consisting of:
a self-contained light supply system;
a self-contained water supply system;
a self-contained heat control system;
a self-contained air supply system; and
any combination of the above, each without limiting other aspects.

49. A self-contained compact plant growth system as described in clause 48 or any other clause and further comprising a separate shipment capable, individual plant growth foundation contained transport enclosure.
50. A self-contained compact plant growth system as described in clause 49 or any other clause wherein said separate shipment capable, individual plant growth foundation contained transport enclosure comprises:
a plurality of growth pods;
a live transport container; and
a time coordinated plant sustenance supply.
51. A self-contained compact plant growth system as described in clause 37 or any other clause wherein said first growth phase maximal spatial density matrix of closely adjacent, movable grow supports comprises a plurality of insertable individual juvenile plant foundations, and wherein said second growth phase maximal spatial density matrix of closely adjacent, movable grow supports comprises a plurality of individual juvenile plant foundation reception locations.
52. A self-contained compact plant growth system as described in clause 51 or any other clause wherein each of said plurality of insertable individual juvenile plant foundations comprise:
a moisture retention feature;
a root penetration feature; and
an adhesive attachment surface.
53. A self-contained compact plant growth system as described in clause 1 or any other clause and further comprising a remote plant growth monitor system.
54. A self-contained compact plant growth system as described in clause 53 or any other clause wherein said remote plant growth monitor system comprises a remote plant growth alert system.
55. A self-contained compact plant growth system as described in clause 53 or any other clause wherein said remote plant growth monitor system comprises a remote parameter plant growth threshold set monitor system.
56. A self-contained compact plant growth system as described in clause 55 or any other clause wherein said remote parameter plant growth threshold set monitor system comprises a remote parameter plant growth threshold set monitor system selected from a group consisting of:
a remote plant temperature monitor system;
a remote plant pH monitor system;
a remote plant moisture monitor system;
a remote plant airflow monitor system;
a remote plant air quality monitor system;
a remote plant light monitor system;
a remote plant electrical power monitor system; and
any combination of the above, each without limiting other aspects.
57. A self-contained compact plant growth system as described in clause 53 or any other clause and further comprising a remote plant growth parameter adjustment system.
58. A self-contained compact plant growth system as described in clause 57 or any other clause wherein said remote plant growth parameter adjustment system comprises an internet of things control system.
59. A self-contained compact plant growth system as described in clause 58 or any other clause wherein said internet of things control system comprises a cellular telephone control system.
60. A self-contained, compact plant growth system comprising:
a common side plant multiple movement system output external enclosure;
a plurality of closely adjacent, movable grow supports having multiple plant placement locations and forming an overlapping, selected growth phase maximal spatial density matrix comprising:
a first growth phase maximal spatial density matrix of vertically stacked, horizontal foundation closely adjacent, movable grow supports; and
a second growth phase maximal spatial density matrix of horizontally stacked, vertical foundation, vertically pivotable, vertical plant growth row supports,
a plurality of individual plant growth foundations configured to be placed at each of said multiple plant placement locations and to hold plants;
a circuitous path, continuous growth sequence support movement system to which said plurality of closely adjacent, movable grow supports are movably responsive;
a centralized plant water supply system configured to supply water for release to each of said multiple plant placement locations on said plurality of closely adjacent, movable grow supports as they pass said centralized supply;
a nutrient supply system configured to supply nutrients for release to said multiple plant placement locations on said plurality of closely adjacent, movable grow supports; and
a distributed light supply system configured to supply select wave lengths of light to each of said multiple plant placement locations on said plurality of closely adjacent, movable grow supports. and description.
61. A self-contained compact plant growth system as described in clause 60 or any other clause and further comprising a separate shipment capable, individual plant growth foundation contained transport enclosure.
62. A self-contained compact plant growth system as described in clause 61 or any other clause wherein said separate shipment capable, individual plant growth foundation contained transport enclosure comprises:
a plurality of growth pods;
a live transport container; and
a time coordinated plant sustenance supply.
63. A self-contained compact plant growth system as described in clause 60 or any other clause wherein said first growth phase maximal spatial density matrix of vertically stacked, horizontal foundation closely adjacent, movable grow supports comprises a plurality of insertable individual juvenile plant foundations, and wherein said second growth phase maximal spatial density matrix of horizontally stacked, vertical foundation, vertically pivotable, vertical plant growth row supports comprises a plurality of individual juvenile plant foundation reception locations.
64. A self-contained compact plant growth system as described in clause 63 or any other clause wherein each of said plurality of insertable individual juvenile plant foundations comprise:
a moisture retention feature;
a root penetration feature; and
an adhesive attachment surface.
65. A self-contained compact plant growth system as described in clause 60 or any other clause and further comprising a remote plant growth monitor system.
66. A self-contained compact plant growth system as described in clause 65 or any other clause wherein said remote plant growth monitor system comprises a remote parameter plant growth threshold set monitor system.

67. A self-contained compact plant growth system as described in clause 66 or any other clause wherein said remote parameter plant growth threshold set monitor system comprises a remote parameter plant growth threshold set monitor system selected from a group consisting of:
a remote plant temperature monitor system;
a remote plant pH monitor system;
a remote plant moisture monitor system;
a remote plant airflow monitor system;
a remote plant air quality monitor system;
a remote plant light monitor system;
a remote plant electrical power monitor system; and
any combination of the above, each without limiting other aspects.
68. A self-contained compact plant growth system as described in clause 60 or any other clause and further comprising a remote plant growth parameter adjustment system.
69. A self-contained compact plant growth system as described in clause 68 or any other clause wherein said remote plant growth parameter adjustment system comprises an internet of things control system.
70. A self-contained compact plant growth system as described in clause 69 or any other clause wherein said internet of things control system comprises a cellular telephone control system.
71. A self-contained, compact plant growth system comprising:
an external enclosure;
a plurality of closely adjacent, movable grow supports having multiple plant placement locations;
a plurality of individual plant growth foundations configured to be placed at each of said multiple plant placement locations and to hold plants;
a circuitous path support movement system to which said plurality of closely adjacent, movable grow supports are movably responsive;
a centralized plant water supply system configured to supply water for release to each of said multiple plant placement locations on said plurality of closely adjacent, movable grow supports as they pass said centralized supply;
a nutrient supply system configured to supply nutrients for release to said multiple plant placement locations on said plurality of closely adjacent, movable grow supports; and
a distributed light supply system configured to supply select wave lengths of light to each of said multiple plant placement locations on said plurality of closely adjacent, movable grow supports.
72. A self-contained compact seed propagation system comprising:
an external enclosure;
a plurality of removable trays configured to hold individual seed pods at plant locations;
a moisture supply system to which said plant locations on said removable trays is responsive;
a propagation maintenance system configured to maintain said plant locations at optimum propagation conditions.

As can be easily understood from the foregoing, the basic concepts of the present invention may be embodied in a variety of ways. It involves both conversion techniques as well as devices to accomplish the appropriate conversion. In this application, the conversion techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements.

Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "support" should be understood to encompass disclosure of the act of "supporting"—whether explicitly discussed or not—and, conversely, were there effectively disclosure of the act of "supporting", such a disclosure should be understood to encompass disclosure of a "support" and even a "means for supporting." Such changes and alternative terms are to be understood to be explicitly included in the description. Further, each such means (whether explicitly so described or not) should be understood as encompassing all elements that can perform the given function, and all descriptions of elements that perform a described function should be understood as a non-limiting example of means for performing that function.

Any patents, publications, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the information disclosure statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

Thus, the applicant(s) should be understood to have support to claim and make a statement of invention to at least: i) each of the power devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) an apparatus for performing the methods described herein comprising means for performing the steps, xii) the various combinations and permutations of each of the elements disclosed, xiii) each potentially dependent claim or concept as a dependency on each and every one of the independent claims, clauses, or concepts presented, and xiv) all inventions described herein.

In addition and as to computer aspects and each aspect amenable to programming or other electronic automation, it should be understood that in characterizing these and all other aspects of the invention—whether characterized as a device, a capability, an element, or otherwise, because all of these can be implemented via software, hardware, or even firmware structures as set up for a general purpose computer, a programmed chip or chipset, an ASIC, application specific controller, subroutine, or other known programmable or circuit specific structure—it should be understood that all such aspects are at least defined by structures including, as person of ordinary skill in the art would well recognize: hardware circuitry, firmware, programmed application specific components, and even a general purpose computer programmed to accomplish the identified aspect. For such items implemented by programmable features, the applicant(s) should be understood to have support to claim and make a statement of invention to at least: xv) processes performed with the aid of or on a computer, machine, or computing machine as described throughout the above discussion, xvi) a programmable apparatus as described throughout the above discussion, xvii) a computer readable memory encoded with data to direct a computer comprising means or elements which function as described throughout the above discussion, xviii) a computer, machine, or computing machine configured as herein disclosed and described, xix) individual or combined subroutines and programs as herein disclosed and described, xx) a carrier medium carrying computer readable code for control of a computer to carry out separately each and every individual and combined method described herein or in any claim, xxi) a computer program to perform separately each and every individual and combined method disclosed, xxii) a computer program containing all and each combination of means for performing each and every individual and combined step disclosed, xxiii) a storage medium storing each computer program disclosed, xxiv) a signal carrying a computer program disclosed, xxv) a processor executing instructions that act to achieve the steps and activities detailed, xxvi) circuitry configurations (including configurations of transistors, gates, and the like) that act to sequence and/or cause actions as detailed, xxvii) computer readable medium(s) storing instructions to execute the steps and cause activities detailed, xxviii) the related methods disclosed and described, xxix) similar, equivalent, and even implicit variations of each of these systems and methods, xxx) those alternative designs which accomplish each of the functions shown as are disclosed and described, xxxi) those alternative designs and methods which accomplish each of the functions shown as are implicit to accomplish that which is disclosed and described, xxxii) each feature, component, and step shown as separate and independent inventions, and xxxiii) the various combinations of each of the above and of any aspect, all without limiting other aspects in addition.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in Hakim v. Cannon Avent Group, PLC, 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 20 or any other claim" or the like, it could be re-drafted as dependent on claim 1, claim 15, or even claim 25 (if such were to exist) if desired and still fall with the disclosure. It should be understood that this phrase also provides support for any combination of elements in the claims and even incorporates any desired proper antecedent basis for certain claim combinations such as with combinations of method, apparatus, process, and the like claims.

Finally, all priority filing(s), the claims set forth later in this specification, and any claims and any clauses set forth at any time are hereby incorporated by reference as part of this description of the invention, and the applicant expressly reserves the right to use all of or a portion of such incorporated content of such claims or such clauses as additional description to support any of or all of the claims or any element or component thereof, and the applicant further expressly reserves the right to move any portion of or all of the incorporated content of such claims or such clauses or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

The claims initially presented are to be understood as also stating in this textual section of the specification, clauses and subject matter that are expressly designated by the applicant to be part of the description of embodiments of the invention. They may be used by the applicant to support any later claim(s) recited, amended, or reinserted in this patent application and may be used to support any claims recited in any subsequent continuation, continuation-in-part, or division patent application. Further, even if subsequently amended, cancelled, or otherwise altered, the claims originally set forth in this and the priority filing(s) are hereby incorporated by reference as part of this section, and the applicant expressly reserves the right to use all of or a portion of any of the content of such as additional description to support any claim or element, any amendment, and any component thereof. The content of this section (both listed and incorporated by reference) shall survive during the entire pendency of this application including any subsequent continuation, division, or continuation-in-part thereof or any reissue or extension thereon.

What is claimed is:

1. A self-contained, compact aeroponic plant growth system comprising:
    a plant movement system external enclosure having an output;
    a circuitous path, continuous growth sequence support movement system within said plant movement system external enclosure;
    a plurality of closely adjacent, movable grow supports having multiple plant placement locations and forming a collective of different selected growth phase maximal spatial density matrices configured in an oval and responsive to said circuitous path, continuous growth sequence support movement system to move in a circuitous path, said plurality of closely adjacent, movable grow supports comprising:
        a first maturity growth phase maximal spatial density matrix of vertically stacked, vertically pivotable, movable vertical plant grow supports;
        a second maturity growth phase maximal spatial density matrix of vertically stacked, vertically pivotable, movable vertical plant grow supports, wherein said second maturity growth phase maximal spatial density matrix is adjacent said first maturity growth phase maximal spatial density matrix and is at a different maturity growth phase from said first maturity growth phase; and
        a plurality of individual plant growth foundations configured to be placed at each of said multiple plant placement locations and to hold plants,
    wherein said plant movement system external enclosure is configured to allow said plurality of closely adjacent, movable grow supports to be serviced from an end of said oval,
    a centralized plant water supply system configured to supply an aeroponic mist of from 10 to 200 microns for release to an entire vertical stack of said multiple plant placement locations on said plurality of closely adjacent, movable grow supports as said vertical stack passes said centralized plant water supply system, said centralized plant water supply system comprising:

a U-shaped chamber configured around at least one said vertical stack of said plurality of closely adjacent, movable grow supports, said U-shaped chamber having a top and a bottom;
at least one injection nozzle body positioned at said bottom of said U-shaped chamber;
at least one retrieval nozzle body positioned at said top of said U-shaped chamber into which unused upward flowing mist passes for mist retrieval;
a high-pressure pump;
a misting nozzle to provide a 10 to 200 micron mist inside said U-shaped chamber and responsive to a flow of water from said high-pressure pump;
a fan positioned upstream and above said misting nozzle configured to create a closed loop flow up from said bottom of said U-shaped chamber to said top of said U-shaped chamber; and
condensate tube positioned at said bottom of said U-shaped chamber;
a nutrient supply system configured to supply nutrients for release to said multiple plant placement locations on said plurality of closely adjacent, movable grow supports; and
a distributed light supply system configured to supply select wave lengths of light to each of said multiple plant placement locations on said plurality of closely adjacent, movable grow supports.

2. A self-contained, compact aeroponic plant growth system as described in claim 1 and further comprising a separate shipment capable, individual plant growth foundation contained transport enclosure.

3. A self-contained, compact aeroponic plant growth system as described in claim 2 wherein said separate shipment capable, individual plant growth foundation contained transport enclosure comprises:
a plurality of growth pods;
a live transport container; and
a time coordinated plant sustenance supply.

4. A self-contained, compact aeroponic plant growth system as described in claim 1 wherein each of said plurality of individual plant growth foundations comprise:
a moisture retention feature;
a root penetration feature; and
an adhesive attachment surface.

5. A self-contained, compact aeroponic plant growth system as described in claim 1 and further comprising a remote plant growth monitor system.

6. A self-contained, compact aeroponic plant growth system as described in claim 5 wherein said remote plant growth monitor system comprises a remote parameter plant growth threshold set monitor system.

7. A self-contained, compact aeroponic plant growth system as described in claim 6 wherein said remote parameter plant growth threshold set monitor system comprises a remote parameter plant growth threshold set monitor system selected from a group consisting of:
a remote plant temperature monitor system;
a remote plant pH monitor system;
a remote plant moisture monitor system;
a remote plant airflow monitor system;
a remote plant air quality monitor system;
a remote plant light monitor system;
a remote plant electrical power monitor system; and
any combination of the above, each without limiting other aspects.

8. A self-contained, compact aeroponic plant growth system as described in claim 1 and further comprising a remote plant growth parameter adjustment system.

9. A self-contained, compact aeroponic plant growth system as described in claim 8 wherein said remote plant growth parameter adjustment system comprises an internet of things control system.

10. A self-contained, compact aeroponic plant growth system as described in claim 9 wherein said internet of things control system comprises a cellular telephone control system.

11. A self-contained, compact aeroponic plant growth system as described in claim 1 wherein said centralized plant water supply system comprises a pulsed plant water supply system configured so that said high-pressure pump and said misting nozzle provide a pulsed 10 to 200 micron mist from said U-shaped chamber.

12. A self-contained, compact aeroponic plant growth system as described in claim 1 and further comprising a gravity fed emergency water supply system configured to supply water during a power loss to each of said multiple plant placement locations on said plurality of closely adjacent, movable grow supports, and having an emergency tank located above said plurality of closely adjacent, movable grow supports.

13. A self-contained, compact aeroponic plant growth system as described in claim 12 wherein said emergency water supply system configured to supply water during a power loss to each of said multiple plant placement locations on said plurality of closely adjacent, movable grow supports comprises a normally open two-way relief valve that will open in the event of a power failure.

14. A self-contained, compact aeroponic plant growth system as described in claim 1 wherein said at least one injection nozzle body positioned at said bottom of said U-shaped chamber comprises a plurality of injection nozzle bodies positioned at said bottom of said U-shaped chamber, and wherein said at least one retrieval nozzle body positioned at said top of said U-shaped chamber into which unused upward flowing mist passes for mist retrieval comprises a plurality of retrieval nozzle bodies positioned at said top of said U-shaped chamber into which unused upward flowing mist passes for mist retrieval.

15. A self-contained, compact aeroponic plant growth system as described in claim 14 wherein said plurality of injection nozzle bodies positioned at said bottom of said U-shaped chamber, and said plurality of retrieval nozzle bodies positioned at said top of said U-shaped chamber into which unused upward flowing mist passes for mist retrieval comprise a plurality of injection nozzle bodies that are parallel with a plurality of retrieval nozzle bodies.

16. A self-contained, compact aeroponic plant growth system as described in claim 1 and further comprising two separately maintained plant growth temperature areas that are separately maintained at different plant growth temperatures within said plant movement system external enclosure.

17. A self-contained, compact aeroponic plant growth system as described in claim 16 wherein said two separately maintained plant growth temperature areas within said plant movement system external enclosure comprise a root side optimum temperature area and a plant side optimum temperature area.

18. A self-contained, compact aeroponic plant growth system as described in claim 17 wherein said collective of different selected growth phase maximal spatial density matrices configured in an oval and responsive to said circuitous path has an oval interior and an oval exterior, and wherein said root side optimum temperature area is positioned at said oval interior and said plant side optimum temperature area is positioned at said oval exterior.

19. A self-contained, compact aeroponic plant growth system as described in claim 1 wherein said condensate tube positioned at said bottom of said U-shaped chamber is configured to facilitate retrieval of water that collects in said U-shaped chamber.

* * * * *